US010242319B2

(12) United States Patent
Cheng et al.

(10) Patent No.: US 10,242,319 B2
(45) Date of Patent: Mar. 26, 2019

(54) BASELINE PREDICTIVE MAINTENANCE METHOD FOR TARGET DEVICE AND COMPUTER PROGRAM PRODUCT THEREOF

(71) Applicant: NATIONAL CHENG KUNG UNIVERSITY, Tainan (TW)

(72) Inventors: Fan-Tien Cheng, Tainan (TW); Yao-Sheng Hsieh, Kaohsiung (TW); Chung-Ren Wang, Tainan (TW); Saint-Chi Wang, Kaohsiung (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 1387 days.

(21) Appl. No.: 13/845,144

(22) Filed: Mar. 18, 2013

(65) Prior Publication Data

US 2014/0025315 A1    Jan. 23, 2014

(30) Foreign Application Priority Data

Jul. 20, 2012    (TW) .............................. 101126242 A

(51) Int. Cl.
*G06N 7/00*    (2006.01)
*G06F 17/18*    (2006.01)
(Continued)

(52) U.S. Cl.
CPC ............. *G06N 7/00* (2013.01); *G05B 23/024* (2013.01); *G05B 23/0283* (2013.01); *G06F 17/10* (2013.01); *G06F 17/18* (2013.01)

(58) Field of Classification Search
CPC ............ G06F 17/10; G06F 17/18; G06N 7/00
(Continued)

(56) References Cited

U.S. PATENT DOCUMENTS 7,243,327 B1    7/2007  Tain et al.
7,593,912 B2    9/2009  Cheng et al.
(Continued)

FOREIGN PATENT DOCUMENTS

CN    101547994 A    9/2009
EP    1914638 A1    4/2008
(Continued)

OTHER PUBLICATIONS

Wei-Ming, et al. A Dynamic-Moving-Window Scheme for Virtual-Metrology Model Refreshing, Oct. 1, 2011, pp. 1-18.*
(Continued)

*Primary Examiner* — Manuel A Rivera Vargas
*Assistant Examiner* — Yaritza H Perez Bermudez
(74) *Attorney, Agent, or Firm* — CKC & Partners Co., LLC

(57) ABSTRACT

A baseline predictive maintenance method for a target device (TD) and a computer program product thereof are provided. Fresh samples which are generated when the target device produces workpieces just after maintenance are collected, and a new workpiece sample which is generated when the target device produces a new workpiece is collected. A plurality of modeling samples are used to build a TD baseline model in accordance with a conjecturing algorithm, wherein the modeling samples include the new workpiece sample and the fresh samples. A TD healthy baseline value for the new workpiece is computed by the TD baseline model, and a device health index (DHI), a baseline error index (BEI) and baseline individual similarity indices ($ISI_B$) are computed, thereby achieving the goals of fault detection and classification (FDC) and predictive maintenance (PdM).

23 Claims, 13 Drawing Sheets

(51) Int. Cl.
*G06F 17/10* (2006.01)
*G05B 23/02* (2006.01)

(58) Field of Classification Search
USPC .......................................................... 702/34
See application file for complete search history.

(56) References Cited

U.S. PATENT DOCUMENTS

| | | | |
|---|---|---|---|
| 8,095,484 | B2 | 1/2012 | Cheng et al. |
| 2006/0030060 | A1* | 2/2006 | Noguchi ................ B82Y 15/00 438/14 |
| 2008/0120060 | A1* | 5/2008 | Kant .................... C10G 11/187 702/138 |
| 2008/0183444 | A1* | 7/2008 | Grichnik ............ G05B 23/0254 703/2 |
| 2010/0235140 | A1* | 9/2010 | Satonaga ............ G01R 31/2803 702/179 |
| 2011/0276828 | A1* | 11/2011 | Tamaki ............. G05B 23/0254 714/26 |
| 2012/0029662 | A1* | 2/2012 | Cheng ................. G05B 13/042 700/29 |
| 2013/0159226 | A1* | 6/2013 | Cheng ................ G03F 7/70616 706/12 |
| 2015/0276558 | A1* | 10/2015 | Cheng ..................... G01N 1/00 702/179 |

FOREIGN PATENT DOCUMENTS

| | | |
|---|---|---|
| JP | 2000-259222 A | 9/2000 |
| JP | 2006-228838 A | 8/2006 |
| JP | 2009-282960 A | 12/2009 |
| TW | 200634509 | 10/2006 |
| TW | 200705230 | 2/2007 |
| TW | 200821602 | 5/2008 |
| TW | 200949596 A | 12/2009 |

OTHER PUBLICATIONS

Wei-Ming Wu, et al., Preliminary Study of a Dynamic-Moving-Window Scheme for Virtual-Metrology Model Refreshing, May 14-18, 2012, IEEE, pp. 5044-5049.*

Wei-Ming Wu, Fan-Tien Cheng, and Fan-Wei Kong/A Dynamic-Moving-Window Scheme for Virtual-Metrology Model Refreshing/ IEEE/ Oct. 1, 2011.

Fan-Tien Cheng, Tsung-Li Wang, Haw-Ching Yang, Shang-Lun Wu, and Chi-Yao Lo/ A Study on Application Cluster Service Scheme and Computer Performance Evaluator/ Journal of the Chinese Institute of Engineers, vol. 31, No. 4, pp. 675-690 (2008).

Wei-Ming Wu et al., "Preliminary Study of a Dynamic-Moving-Window Scheme for Virtual-Metrology Model Refreshing," 2012 IEEE International Conference on Robotics and Automation, RiverCentre, Saint Paul, Minnesota, USA, May 14-18, 2012.

Hack-Eun Kim et al., Bearing fault prognosis based on health state probability estimation, Expert Systems with Applications, vol. 39, Issue 5, Apr. 2012, pp. 5200-5213.

* cited by examiner

BASELINE PREDICTIVE MAINTENANCE METHOD FOR TARGET DEVICE AND COMPUTER PROGRAM PRODUCT THEREOF

RELATED APPLICATIONS

The present application is based on, and claims priority from Taiwan Application Serial Number 101126242, filed Jul. 20, 2012, the disclosure of which is hereby incorporated by reference herein in its entirety.

BACKGROUND

Field of Invention

The present invention relates to a predictive maintenance (PdM) method and a computer program product thereof. More particularly, the present invention relates to a baseline predictive maintenance (BPM) method for a target device (TD) based on virtual metrology (VM) and a computer program product thereof.

Description of Related Art

Production equipment is an essential part for any manufacturing factory. Failure of a component, a module, or a device (such as a heater, a pressure module, and a throttle valve, etc.) in the production equipment may cause production abnormalities which lead to poor product quality and/or low production capacity and thus cause significant losses.

In general, the most-commonly utilized approach for remedying the aforementioned problems is to perform scheduled preventive maintenance (PM). That is, to execute maintenance-related operations at a predetermined time interval. The predetermined time interval is basically decided according to the mean-time-between-failure (MTBF) of the target device (TD). As such, how to schedule a proper PM is usually a key issue for the factories. An improper scheduled PM may increase the maintenance cost or lower the production capacity.

To improve equipment maintenance programs for increasing fab performance, the International SEMATECH Manufacturing Initiative (ISMI) proposed an initiative of predictive and preventive maintenance (PPM). As defined by ISMI, PPM includes preventive maintenance (PM), condition-based maintenance (CbM), predictive maintenance (PdM), and breakdown maintenance (BDM). Among them, the ISMI claimed that CbM and PdM capabilities should be developed and available as an individual module or incremental modules so that an end user can choose to implement one, some, or all of the capabilities. CbM is defined as: "Maintenance is performed after one or more indicators show that equipment is going to fail or that equipment performance is deteriorating." The technique of fault-detection-and-classification (FDC) is an approach related to CbM and is defined as: "Monitoring equipment and factory data to assess equipment health, and invoking warnings and/or tool shutdown when a fault is detected." On the other hand, PdM is the technique of applying a predictive model to relate facility-state information to maintenance information for forecasting the remaining useful life (RUL) and the need for maintenance events that will alleviate unscheduled downtime.

Most conventional FDC approaches are to find out the TDs required for monitoring and the TDs' related key parameters needed to be monitored, and then by applying a statistical-process-control (SPC) approach to detect faults. Referring to FIG. 1, FIG. 1 is a SPC control chart of throttle-valve angles in a plasma-enhanced-chemical-vapor-deposition (PECVD) Tool, wherein a key parameter of the target device (TD) to be monitored is an angle of a throttle (i.e. throttle-valve angle). However, in a practical situation, abnormality of the throttle-valve angle may not be solely caused by itself; instead, it may also be due to the influence of other related parameters. As shown in FIG. 1, the central angle of the throttle-valve is 27 degrees; its upper control limit (UCL) and lower-control limit (LCL) are 32 and 22 degrees respectively as defined by maintenance engineers; and 450 samples in total are monitored. The conventional SPC method concludes that those samples in circles 1, 2 and 4 are outliers while the sample in circle 3 is within the control limit. After careful inspections, the samples in circles 2 and 4 are indeed abnormal and are caused by the throttle-valve's malfunction. As for the sample in circle 1, the abnormality is not caused by the throttle-valve itself, but is resulted from the deviation of the related-parameter "Ammonia ($NH_3$)". Also, the deflection shown in circle 3 is due to the deviation of the related-parameter "Tube Pressure". As such, the conventional SPC method cannot detect and diagnose the faults at the samples in circles 1 and 3.

Hence, there is a need to provide baseline predictive maintenance (BPM) method for a target device (TD) and a computer program product thereof to overcome the disadvantages of the aforementioned conventional skills.

SUMMARY

An object of the present invention is to provide a baseline predictive maintenance (BPM) method for a target device (TD) based on virtual metrology (VM) and a computer program product thereof for inferring the healthy status of the TD and forecasting remaining useful life (RUL) of the TD, thereby overcoming the disadvantages of the aforementioned conventional skills.

According to an aspect of the present invention, a baseline predictive maintenance method is provided. In the baseline predictive maintenance method, at first, a plurality of fresh samples which are generated when a target device (TD) just after maintenance produces a plurality of workpieces are collected. Then, a new workpiece sample which is generated when the target device produces a new workpiece is collected, wherein each of the fresh samples and the new workpiece sample includes a set of paired data consisting of a set of TD-related process data (X) and an actual representative value ($y_T$) generated by the target device, and the set of TD-related process data (X) comprises a plurality of parameters. Thereafter, a TD baseline model is built by using a plurality of modeling samples in accordance with a conjecturing algorithm, wherein the modeling samples include the new workpiece sample and the fresh samples. Then, the TD baseline model is used to compute a healthy baseline value ($\hat{y}_B$) of the target device when the new workpiece is produced, wherein the healthy baseline value is a predicted value of the actual representative value ($y_T$) that the target device under a healthy status should have when producing the new workpiece. Thereafter, a device health index (DHI), a baseline error index (BEI) and baseline individual similarity indexes ($ISI_B$) of the new workpiece sample are computed. Then, the goals of FDC and PdM can be achieved via determination logics and $y_T/\hat{y}_B$ comparisons.

In one embodiment, the aforementioned conjecturing algorithm is a neural network (NN) algorithm, a multi-regression (MR) algorithm, a support vector machines (VM) algorithm or a partial least Squares (PLS) algorithm.

In one embodiment, the baseline predictive maintenance method further includes: converting the actual representative value ($y_T$) of the new workpiece sample to a device health index (DHI) in accordance with a set of first conversion formulas as follows:

when $\bar{y}_T < y_T < UCL$, (1)

$DHI = \bar{y}_{T\_mapping} - \left( \frac{y_T - \bar{y}_T}{UCL - \bar{y}_T} \times (\bar{y}_{T\_mapping} - UCL\_mapping) \right);$ when $UCL < y_T < USL$, $DHI =$ $UCL\_mapping - \left( \frac{y_T - UCL}{USL - UCL} \times (UCL\_mapping - USL\_mapping) \right);$ when $USL < y_T < \text{Max } y_T$, $DHI =$ $USL\_mapping - \left( \frac{y_T - USL}{\text{Max } y_T - USL} \times (USL\_mapping - \text{Max } y_{T\_mapping}) \right);$ when $LCL < y_T < \bar{y}_T$, (2)

$DHI = \bar{y}_{T\_mapping} - \left( \frac{\bar{y}_T - y_T}{\bar{y}_T - LCL} \times (\bar{y}_{T\_mapping} - LCL\_mapping) \right);$ when $LSL < y_T < LCL$, $DHI = LCL\_mapping - \left( \frac{LCL - y_T}{LCL - LSL} \times (LCL\_mapping - LSL\_mapping) \right);$ when $\text{Min } y_T < y_T < LSL$, $DHI =$ $LSL\_mapping - \left( \frac{LSL - y_T}{LSL - \text{Min } y_T} \times (\text{Min } y_{T\_mapping} - LSL\_mapping) \right);$ wherein $\bar{y}_T$ represents the mean of the actual representative values ($y_T$) of the fresh samples, and $\bar{y}_{T\_mapping}$ is a conversion value corresponding to $\bar{y}_T$;

Max $y_T$ represents the maximum actual representative value of the fresh samples, and Max $y_{T\_mapping}$ is a conversion value corresponding to Max $y_T$;

Min $y_T$ represents the minimum actual representative value of the fresh samples, and Min $y_{T\_mapping}$ is a conversion value corresponding to Min $y_T$;

LSL is a lower specification limit; LCL is a lower control limit; USL is an upper specification limit; UCL is an upper control limit; LSL_mapping is a conversion value corresponding to the LSL; LCL_mapping is a conversion value corresponding to the LCL; USL_mapping is a conversion value corresponding to the USL; and UCL_mapping is a conversion value corresponding to the UCL.

In one embodiment, when $\bar{y}_{T\_mapping}$>DHI>UCL_mapping (or $\bar{y}_{T\_mapping}$>DHI>LCL_mapping), the target device is healthy and normally operated; when UCL_mapping>DHI>USL_mapping (or LCL_mapping>DHI>LSL_mapping), the target device is sick and cannot work after remaining useful life (RUL) of the target device is worn out; and when USL_mapping>DHI>Max $y_{T\_mapping}$ (or LSL_mapping>DHI>Min $y_{T\_mapping}$), the target device is dead and needs maintenance immediately.

In one embodiment, the baseline predictive maintenance method further includes: converting the actual representative value ($y_T$) of the new workpiece sample and the healthy baseline value ($\hat{y}_B$) of the target device producing the new workpiece to a BEI in accordance with a set of second conversion formulas as follows:

$y_E = |y_T - \hat{y}_B|;$ (3)

when $0 < y_E \leq Spec$, $BEI = Zero\_mapping - \left( \frac{y_E}{Spec} \times Spec\_mapping \right);$ when $Spec < y_E \leq (HardSpec - \bar{y}_T)$, $BEI = Spec\_mapping - \left( \frac{\frac{y_E - Spec}{(HardSpec - \bar{y}_T) - Spec} \times}{(Spec\_mapping - (HardSpec - \bar{y}_T)\_mapping)} \right);$ when $(HardSpec - \bar{y}_T) < y_E$, $BEI = (HardSpec - \bar{y}_T)\_mapping -$ $\left( \frac{\frac{y_E - (HardSpec - \bar{y}_T)}{\text{Max } y_E - (HardSpec - \bar{y}_T)} \times}{((HardSpec - \bar{y}_T)\_mapping - \text{Max } y_{E\_mapping})} \right);$ wherein Spec represents a specification of the target device; HardSpec represents a hard specification of the target device; Max $y_E$ represents the maximum allowable $y_E$ of the fresh samples after conversion; Zero_mapping represents a conversion value corresponding to when $y_E=0$; Spec_mapping represents a conversion value corresponding to Spec; (HardSpec-$\bar{y}_T$)_mapping represents a conversion value corresponding to (HardSpec-$\bar{y}_T$); Max $y_{E\_mapping}$ represents a conversion value corresponding to Max $y_E$.

In one embodiment, when Zero_mapping>BEI>Spec_mapping, the target device is healthy and normally operated; when Spec_mapping>BEI>(HardSpec-$\bar{y}_T$)_mapping, the target device is sick and cannot work after remaining useful life (RUL) of the target device is worn out; and when (HardSpec-$\bar{y}_T$)_mapping>BEI>Max $y_{E\_mapping}$, the target device is dead and needs maintenance immediately.

In one embodiment, the baseline predictive maintenance method further includes: computing the mean and standard deviation of each of the parameters in the sets of TD-related process data (X) of the fresh samples and performing a standardization procedure therewith, thereby obtaining a baseline individual similarity index ($ISI_B$) of each of the parameters in the set of TD-related process data (X) of the new workpiece sample.

In one embodiment, if DHI≥$DHI_T$ and the $ISI_B$ of each of the parameters in the set of TD-related process data (X) of the new workpiece sample is smaller than its $ISI_{B\_T}$, it represents that the target device is healthy and the process parameters corresponding to the target device are normally operated; if DHI≥$DHI_T$ and at least one of the baseline individual similarity indexes ($ISI_B$) of the parameters in the set of TD-related process data (X) of the new workpiece sample is greater than or equal to its $ISI_{B\_T}$, it represents that the target device is healthy but at least one of the process parameters corresponding to the target device is abnormal and should be checked; if DHI<$DHI_T$ and BEI≥$BEI_T$; or DHI<$DHI_T$ and at least one of the baseline individual similarity indexes ($ISI_B$) of the parameters in the set of TD-related process data (X) of the new workpiece sample is greater than or equal to its $ISI_{B\_T}$, it represents that the target device is healthy but the target device is out-of-control (OOC) due to abnormality of at least one of the process parameters corresponding to the target device, which should be checked; and if DHI<$DHI_T$ and BEI<$BEI_T$ and the $ISI_B$ of each of the parameters in the set of TD-related process data (X) of the new workpiece sample is smaller than its $ISI_{B\_T}$, it represents that the target device is abnormal and caused by itself and needs maintenance immediately; wherein $DHI_T$ is a threshold value of DHI, and $ISI_{B\_T}$ is a threshold value of $ISI_B$.

In one embodiment, the baseline predictive maintenance method further includes: deleting the new workpiece sample from the modeling samples.

In one embodiment, the baseline predictive maintenance method further includes: collecting a next new workpiece sample which is generated when the target device produces a next new workpiece, wherein the next new workpiece sample has the same elements as the new workpiece sample; adding the next new workpiece sample to the modeling samples and then rebuilding the TD baseline model by using the modeling samples in accordance with the conjecturing algorithm; using the TD baseline model to compute another healthy baseline value ($\hat{y}_B$) of the target device when the next new workpiece is produced; computing $y_E=|y_T-\hat{y}_B|$ of the next new workpiece sample; and if the $y_E$ of the new workpiece sample and the $y_E$ of the next new workpiece sample both are greater than a threshold value, using a predictive algorithm for predicting remaining useful life (RUL) of the target device, wherein the predictive algorithm may adopt a curve fitting method such as a linear curve fitting (LCF) method or a regression-based exponential curve fitting (ECF) method; or a time-series forecasting method such as an auto-regressive integrated moving average (ARIMA) method.

In one embodiment, the baseline predictive maintenance method further includes: collecting a plurality of historical samples which are healthy and generated by the target device, wherein the historical samples is generated when the target device is under the healthy status and produces a plurality of historical workpieces; and adding the historical samples to the modeling samples.

In one embodiment, the baseline predictive maintenance method further includes: selecting a plurality of concise and healthy historical samples from he historical samples by using, for example, a dynamic moving window (DMW) method.

According to another aspect of the present invention, a computer program product stored on a non-transitory tangible computer readable recording medium is provided. When this computer program product is loaded and executed by a computer, the aforementioned baseline predictive maintenance method is performed.

Hence, the application of the embodiments of the present invention can effectively infer the healthy status of the TD and forecast remaining useful life (RUL) of the TD.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
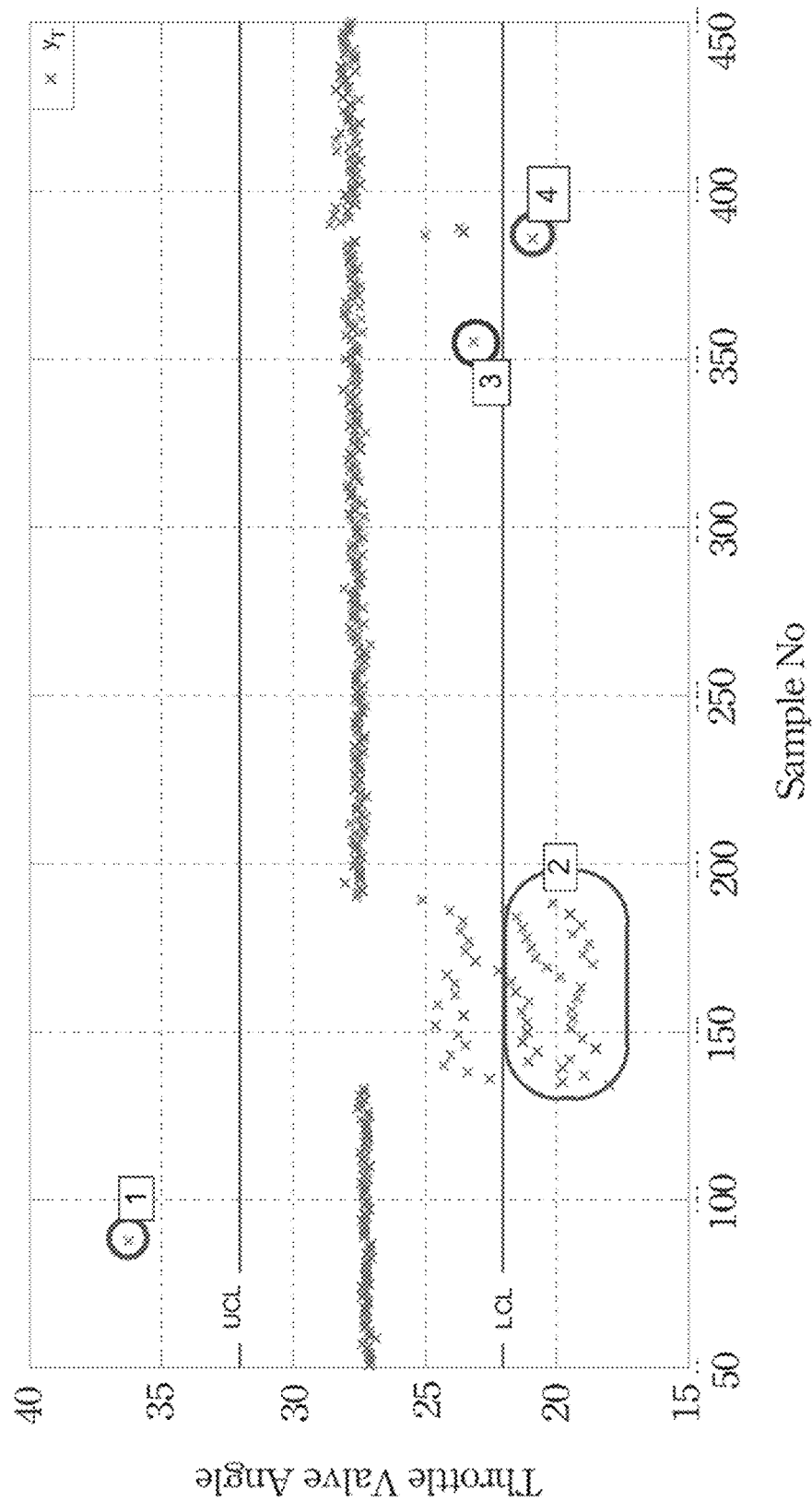
FIG. 1 is a SPC control chart of throttle-valve angles in a plasma-enhanced-chemical-vapor-deposition (PECVD) Tool.

Reference will now be made in detail to the embodiments of the present invention, examples of which are illustrated in the accompanying drawings. Wherever possible, the same reference numbers are used in the drawings and the description to refer to the same or like parts.

Figure 2:
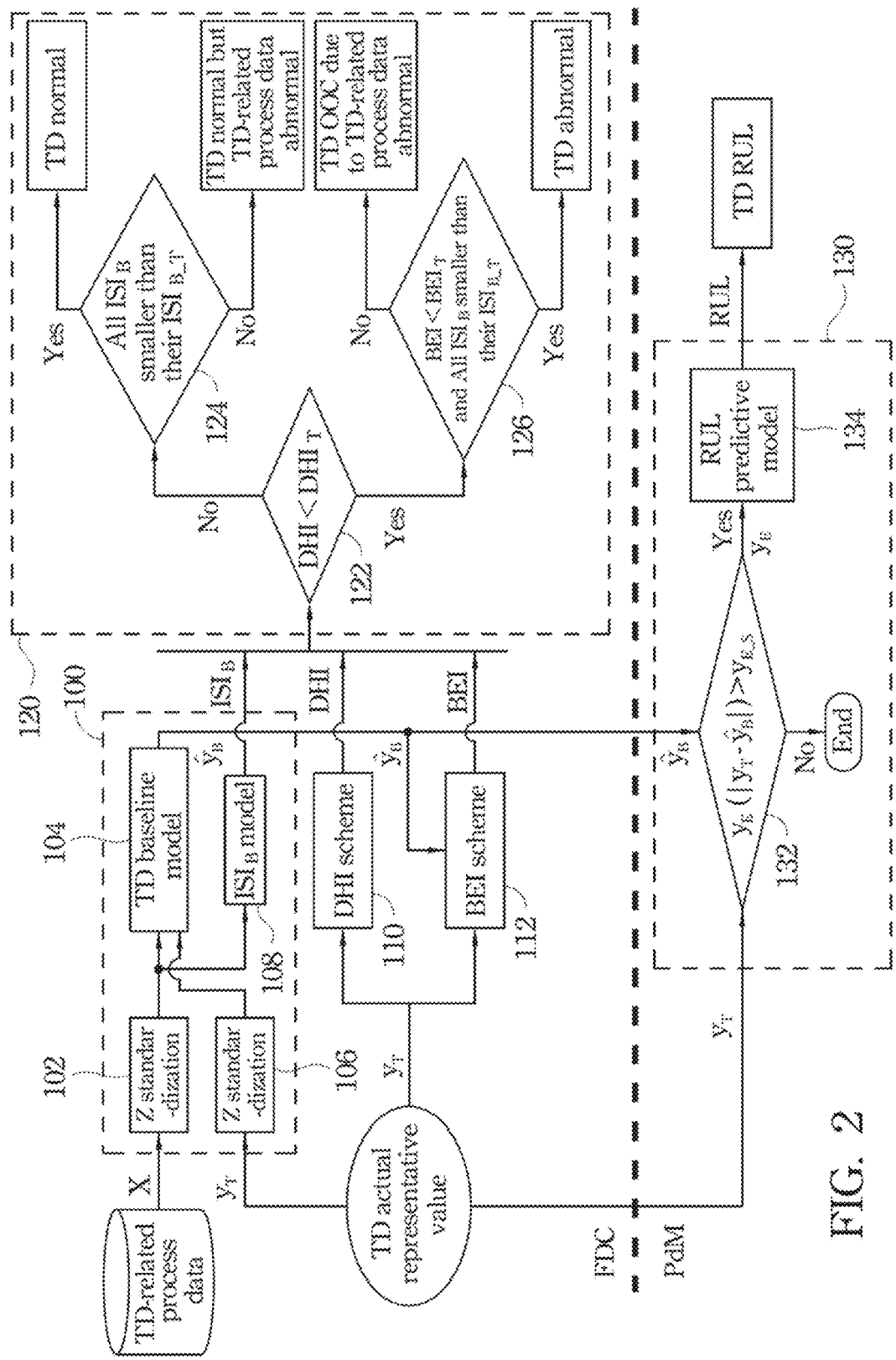
FIG. 2 is schematic structural diagram of a BPM system used for performing a BPM method according to an embodiment of the present invention.

The present invention provides a virtual metrology (VM)-based baseline predictive maintenance (BPM) method and a computer program product thereof. The BPM method possesses the capabilities of FDC and PdM. Referring to FIG. 2, FIG. 2 is schematic structural diagram of a BPM system used for performing a BPM method according to an embodiment of the present invention, wherein the BPM system includes a FDC portion and a PdM portion. The FDC portion includes a healthy baseline model 100, a DHI scheme 110, a BEI scheme 112 and a FDC logic 120. The healthy baseline model 100 includes a TD baseline model 104 and an $ISI_B$ model 108. The PdM portion includes a RUL forecast 130. Hereinafter, respective schemes and models are explained.

TD Baseline Model 104

The TD baseline model 104 is mainly used for generating a healthy baseline value ($\hat{y}_B$) of a target device (TD; for example, a throttle valve). The so-called TD healthy baseline value represents a predicted value of an actual representative value that the target device should have f being at a healthy status, when the target device produces a new workpiece by using a set of TD-related process data (X) containing a plurality of parameters such as $NH_3$, $SiH_4$, Pressure, and RF Power, etc., wherein the actual representative value (for example, a throttle valve angle) is represented by $y_T$. In other word, when the actual representative value ($y_T$) of the TD when producing the new workpiece is deviated too much from the $\hat{y}_B$, it means that the TD at this time is abnormal, and the reason causing the TD abnormality should be found out. The so-called TD-related process data stand for the process parameters having cause-effect relationships with the TD but not the actual representative value of the TD itself.

Figure 3A:
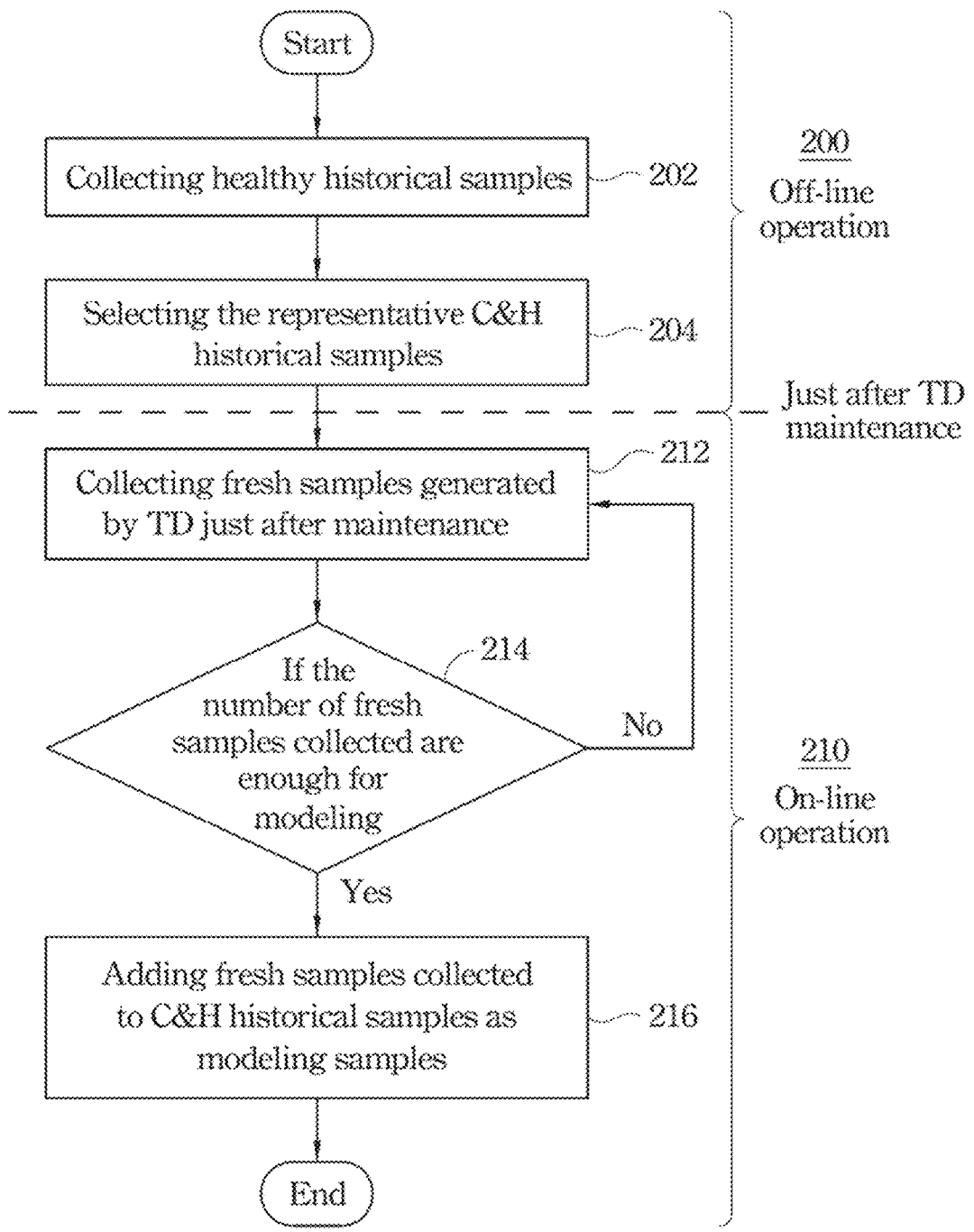
FIG. 3A and FIG. 3B are flow charts showing methods for collecting modeling samples required for building a TD baseline model according to two embodiments of the present invention.
Figure 3B:
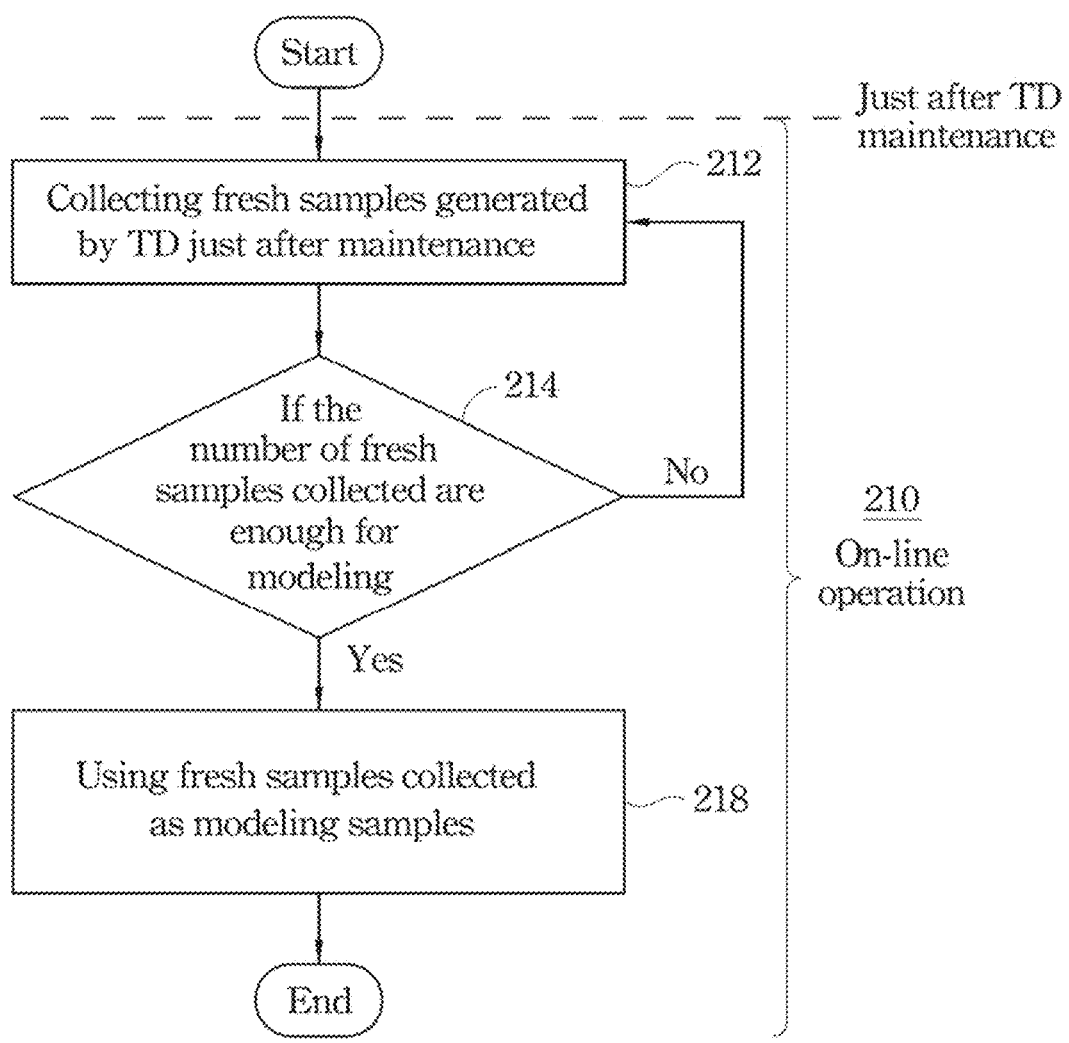
Figure 6:
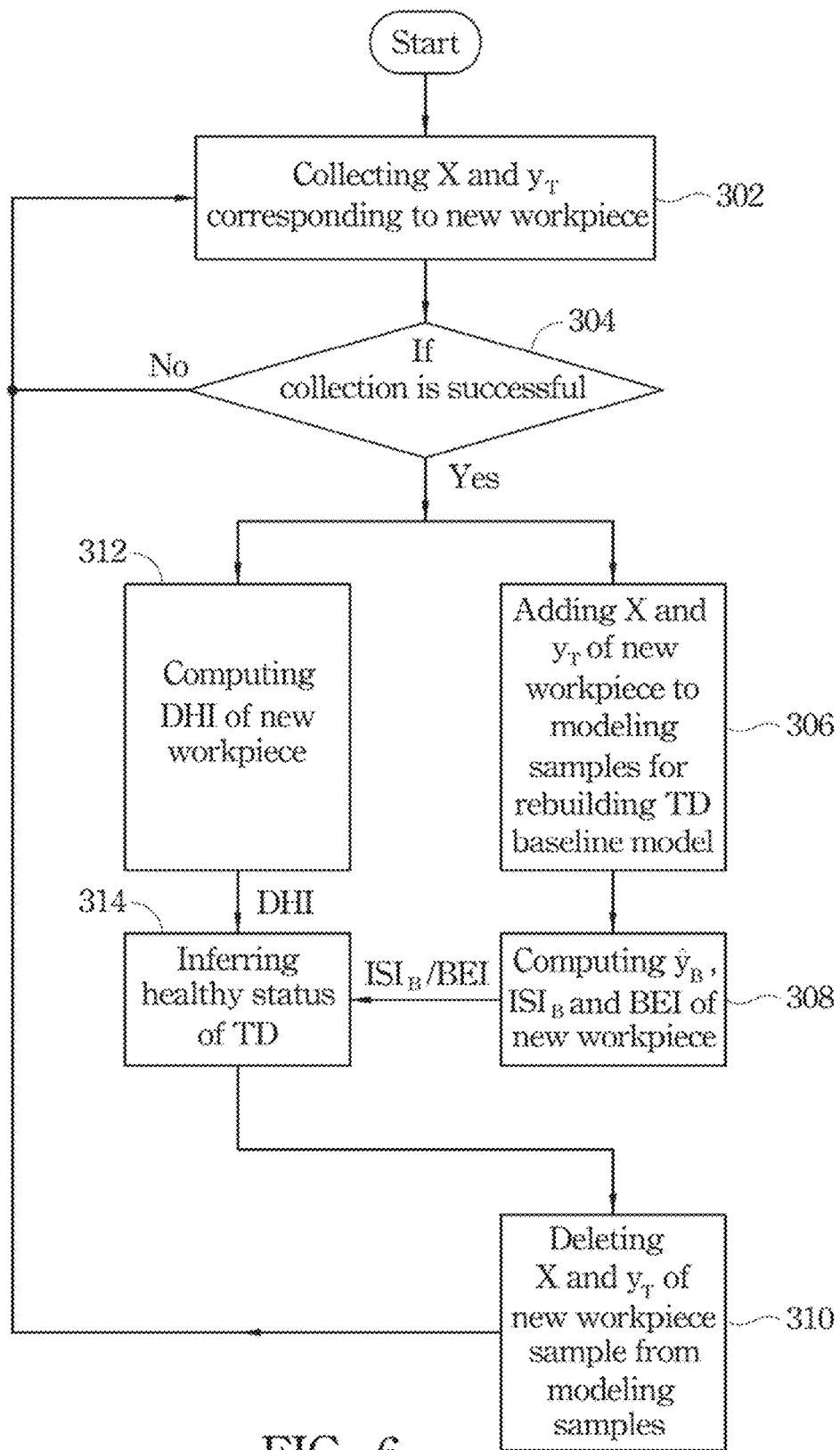
FIG. 6 is flow chart of producing the TD baseline model 104 and computing DHI, BEI, $ISI_B$ and $\hat{y}_B$ required for performing the FDC portion.

Referring to FIG. 3A, FIG. 3B and FIG. 6, FIG. 3A and FIG. 3B are flow charts showing methods for collecting modeling samples required for building the TD baseline model 104 according to two embodiments of the present invention, and FIG. 6 is flow chart of producing the TD baseline model 104 and computing DHI, BEI, $ISI_B$ and $\hat{y}_B$ required for performing the FDC portion. In FIG. 3A, an offline operation 200 and an on-fine operation 210 are executed; but in FIG. 3B, only an on-line operation 210 is executed. There are three sources for obtaining the modeling samples required for building the TD baseline model 104, i.e. a plurality of concise and healthy (C&H) historical samples (from the off-line operation 200), a plurality of fresh samples (from the on-line operation 210) and a new workpiece sample (from step 302 shown in FIG. 6), wherein the C&H historical samples can be optionally added as the modeling samples. The purpose of adopting the C&H historical samples is to enhance the operating space of the modeling samples and to reduce the noises of the modeling samples, thereby increasing prediction accuracy. However, it is not easy to obtain the C&H historical samples. Therefore, the fresh samples may merely be adopted when the C&H historical samples have not been obtained yet. In other words, the on-line operation 210 may be solely performed to collect the modeling samples if the C&H historical samples from the off-line operation 200 are not available.

As shown in FIG. 3A, the step of the embodiment for collecting the model samples required for building the TD baseline model includes two steps: the off-line operation 200 and the on-line operation 210. The off-line operation 200 performs a keep-important-sample (KIS) method to select C&H historical samples, and the on-line operation 210 collects fresh samples generated by a target device (TD) which has just been through maintenance, wherein each of the fresh samples and the C&H historical samples includes a set of paired data consisting of a set of TD-related process data (X) and an actual representative value ($y_T$) generated by the target device. In the off-line operation 200, the KIS method includes step 202 and step 204. Step 202 is used to ensure the appropriateness of every historical sample collected, which means the sample was generated when the TD is under a healthy status and its data quality is good. The so-called "healthy status" means the behaviors of the TD which is normally operated, which can be defined by those who are skilled in the art. The so-called "good data quality" means that, when the TD and the process parameters having cause-effect relationships with the TD are under normal operation, the data quality collected from the performance of the TD is good, i.e. the data are collected under the situations without human errors or abnormalities. It is noted that, in the on-line operation 210, since the TD is just after maintenance and is situated under the "healthy status", the fresh samples generated at this time can be considered as the healthy samples.

Thereafter, the off-line operation 200 can optionally perform step 204 for selecting the representative C&H historical samples, so as to avoid using too many samples for modeling and affecting the model accuracy. Step 204 may utilize a dynamic-moving-window (DMW) scheme for picking out the representative C&H samples from all of the healthy historical samples collected in step 202, but also may use another sample selection method, and thus embodiments of the present invention are not limited thereto. The DIM scheme is capable of adding a new sample into the model with a predefined window size and apply a clustering technology to do similarity clustering. Next, the number of samples in each cluster is checked. If the number of the sets of sample data in the largest group is greater than a predetermined threshold, it means that there are too many sets of sample data with similar properties in the largest group, and the oldest sample data in the largest group can be deleted. If the number of the sets of sample data in the largest group is smaller than or equal to a predetermined threshold, it means that the sample data in the largest group should be kept for building or refreshing the prediction model. The DMW method is described in the applicant's paper (W.-M. Wu, F.-T. Cheng and E-W. Kong, "A Dynamic-Moving-Window Scheme for Virtual-Metrology Model Refreshing," *IEEE Transactions on Semiconductor Manufacturing*, vol 25, pp. 238-246, May 2012), which is hereby incorporated by reference. Further, the C&H historical samples and the fresh samples for modeling have to be standardized (Z-score) by standardizing modules 102 and 106.

The on-line operation is performed just after the TD has been through maintenance, and includes: performing step 212 for collecting a plurality of fresh samples generated by the TD just after maintenance; performing step 214 for checking if the number of the fresh samples are enough for modeling; when the result of step 214 is "yes", performing step 216 for adding the fresh samples collected to the C&H historical samples as the modeling samples; and when the result of step 214 is "no", performing step 212 again. Up to this point, a portion of modeling samples are collected.

The rule of thumb for determining the number of samples needed for building the healthy baseline model 100 is about 10 times of the number of the parameters in the set of TD-related process data (X), wherein the quantity ratio between the C&H historical samples and the fresh samples are 3 to 1. All of the samples (the fresh samples and the C&H historical samples) created in step 216 are utilized to construct the TD baseline model 104. Therefore, the TD baseline model 104 not only contains the C&H historical samples but also possesses the data information of the fresh samples from the TD just after maintenance such that the healthy baseline of the TD can be generated. With the necessary important samples being completely collected, the TD baseline model can be built and can function properly.

As described above, the fresh samples can be considered as healthy samples. Therefore, when it is difficult to obtain the C&H historical samples, another embodiment of the present invention only adopts the fresh samples and a newly-entered workpiece sample as the modeling samples for constructing the TD baseline model 104. As shown in FIG. 3B, when the result of step 214 is "yes", step 218 is performed for using the fresh samples collected as the modeling samples without the C&H historical samples.

The procedures for building and executing the TD baseline model 104 will be described later.

$ISI_B$ Model 108

ISI of an individual process parameter is defined as the degree of similarity between this individual process-parameter's standardized process datum of the input set and the same process-parameter's standardized process data in all the historical sets that are used for training and tuning the ISI model. The $ISI_B$ model 108 is built mainly by using the ISI scheme disclosed in U.S. Pat. No. 7,593,912, in which a standardization step is performed on the parameters forming the set of TD-related process data (X) of the new workpiece sample with respect to the mean and standard deviation of the corresponding parameters forming each set of TD-related process data (X) of the fresh samples, thereby obtaining a plurality of individual similarity indexes (ISIs) of the parameters for understanding the variations of the parameters. The U.S. Pat. No. 7,593,912 is incorporated herein by reference, which has the same assignee with this application. It is worthy to be noted that this embodiment only use the fresh samples generated by the TD just after maintenance for constructing the $ISI_B$ model 108, such that the $ISI_B$ healthy baseline of the TD within a particular maintenance cycle can be generated.

DHI Scheme 110

Generally speaking, on-line SPC schemes are utilized to monitor the quality status during manufacturing processes, and necessary actions are performed if the process is out of statistical control. The DHI scheme 110 applies the concept of on-line SPC to convert $|y_T-\bar{y}_T|$ into DHI, wherein $\bar{y}_T$ represents the mean of the actual representative values in the fresh samples (obtained in step 212), and $y_T$ is the actual representative value of the TD in a new workpiece sample generated when a new workpiece is produced thereby. It is noted that this embodiment only use the fresh samples generated by the TD just after maintenance for constructing the DHI scheme 110, such that the DHI healthy baseline of the TD within a particular maintenance cycle can be generated.

Figure 4:
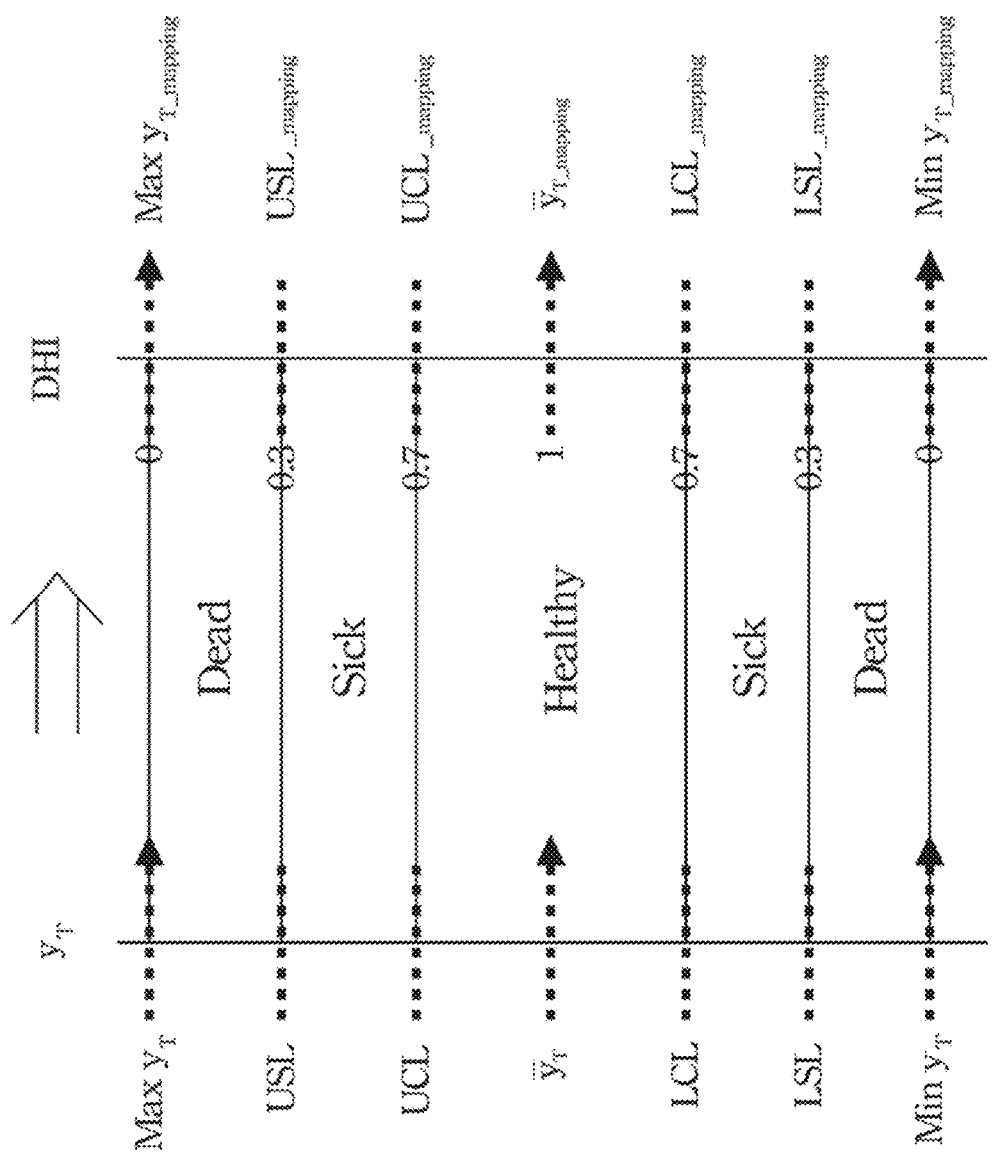
FIG. 4 shows a configuration of SPC control chart of $y_T$ with $\bar{y}_T$ being the baseline value and at the center.

Referring to FIG. 4, FIG. 4 shows a configuration of SPC control chart of $y_T$ with the $\bar{y}_T$ being the baseline value and at the center, indicating a conversion value ($\bar{y}_{T\_mapping}$) corresponding to $\bar{y}_T$; a conversion value (Max $y_{T\_mapping}$) corresponding to the maximum actual representative value (Max $y_T$) of the fresh samples; a conversion value (Min $y_{T\_mapping}$) corresponding to the minimum actual representative value (Min $y_T$) of the fresh samples; a conversion value (LSL_$mapping$) corresponding to the lower specification limit (LSL); a conversion value (LCL_$mapping$) corresponding to the lower control limit (LCL); a conversion value (USL_$mapping$) corresponding to the upper specification limit (USL); and a conversion value (UCL_$mapping$) corresponding to the upper control limit (UCL), wherein Min $y_{T\_mapping}$, LSL_$mapping$, LCL_$mapping$, $\bar{y}_{T\_mapping}$, UCL_$mapping$, USL_$mapping$ and Max $y_{T\_mapping}$ are 0, 0.3, 03, 1, 0.7 0.3 and 0, for example, respectively. The definitions of the specifications UCL, LCL, USL and LSL are varied with the physical properties of the TD. For a throttle valve, its UCL and LCL are a nominal angle plus 5 degrees and the nominal angle minus 5 degrees; its USL is the nominal angle plus 50 degrees; and its LSL is the nominal angle minus 20 degrees. Considering the physical properties, when the open angle of the throttle valve is greater than 50 degrees or smaller than 20 degrees, its gas-exhaust efficiency becomes poor; and when its open angle is greater than the nominal angle plus 5 degrees or smaller than the nominal angle minus 5 degrees, its health status should be concerned. UCL, LCL, USL and LSL are common technical measures used by the conventional SPC, and thus are further explained herein. When 0, 0.3, 0.7, 1, 0.7, 0.3 and 0 are introduced into Min $y_{T\_mapping}$, LSI_$mapping$, LCL_$mapping$, $\bar{y}_{T\_mapping}$, UCL_$mapping$, USL_$mapping$ and Max $y_{T\_mapping}$ in the formulas (1) in the above, the DHI formulas of converting $y_T$ to DHI in the upper half of FIG. 4 are obtained as follows:

when $\bar{y}_T < y_T < UCL$, (1')

$$DHI = 1 - \left(\frac{y_T - \bar{y}_T}{UCL - \bar{y}_T} \times 0.3\right);$$

when $UCL < y_T < USL$, $$DHI = 0.7 - \left(\frac{y_T - UCL}{USL - UCL} \times 0.4\right);$$

when $USL < y_T < \text{Max } y_T$, $$DHI = 0.3 - \left(\frac{y_T - USL}{\text{Max } y_T - USL} \times 0.3\right).$$

By the same token, form the formulas (2) in the above, the formulas of converting $y_T$ to DHI in the lower half of FIG. 4 are obtained as follows:

when $LCL < y_T < \bar{y}_T$, (2')

$$DHI = 1 - \left(\frac{\bar{y}_T - y_T}{\bar{y}_T - LCL} \times 0.3\right);$$

when $LSL < y_T < LCL$, $$DHI = 0.7 - \left(\frac{LCL - y_T}{LCL - LSL} \times 0.4\right);$$

when $\text{Min } y_T < y_T < LSL$, $$DHI = 0.3 - \left(\frac{LSL - y_T}{LSL - \text{Min } y_T} \times 0.3\right);$$

In this embodiment, UCL/LCL and USL/LSL are corresponding to process spec and hard spec of the TD, and the associated DHI values are 0.7 and 0.3, respectively. With the above definitions, the following statements are made.

When $\bar{y}_{T\_mapping}$ (for example, 1)>DHI>UCL_$mapping$ (for example, 0.7) (or $\bar{y}_{T\_mapping}$ (for example, 1)>DHI>LCL_$mapping$ (for example, 0.7)), the target device is healthy and normally operated;

when UCL_$mapping$ (for example, 0.7)>DHI>USL_$mapping$ (for example, 0.3) (or LCL_$mapping$ (for example, 0.7) >DHI>LSL_$mapping$ (for example, 0.3)), the target device is sick and cannot work after remaining useful life (RUL) of the target device is worn out; and when USL_$mapping$ (for example, 0.3)>DHI>Max $y_{T\_mapping}$ (for example, 0) (or LSI_$mapping$ (for example, 0.3)>DHI>Min $y_{T\_mapping}$ (for example, 0)), the target device is dead and needs maintenance immediately.

BEI Scheme 112

Figure 5:
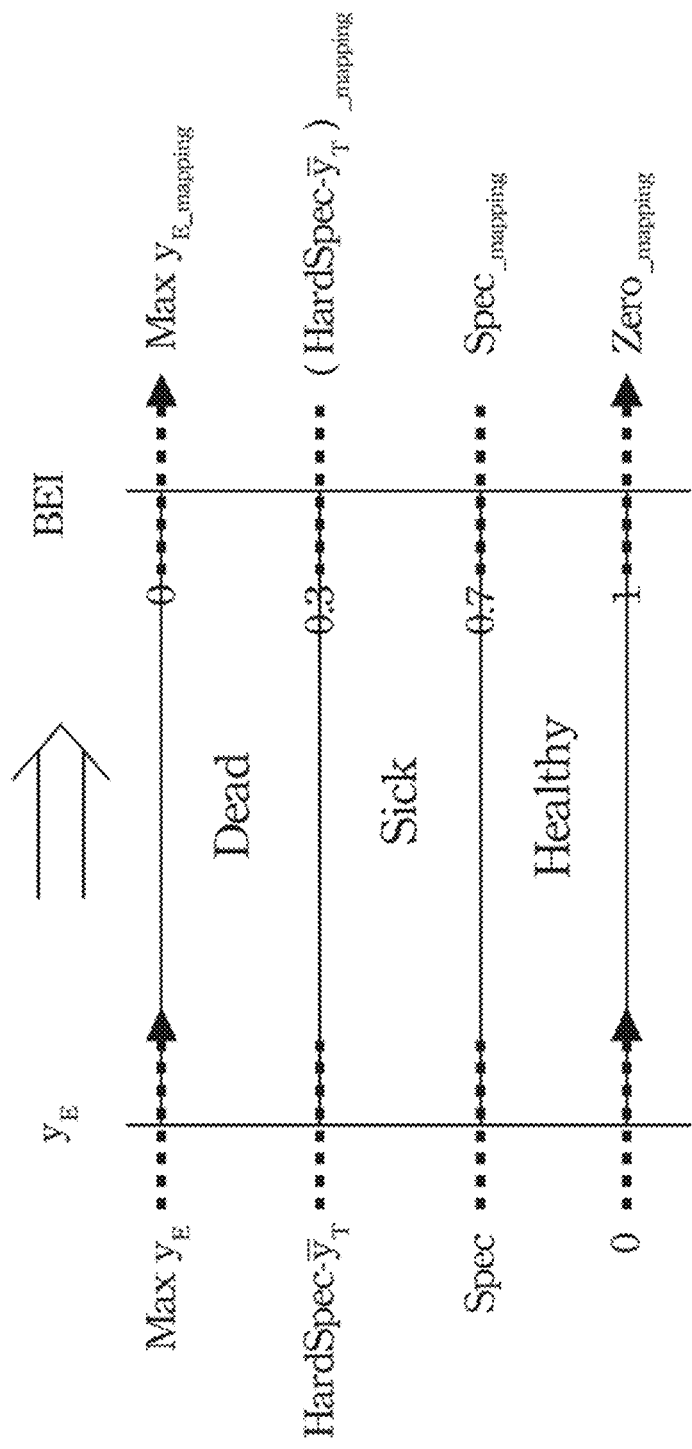
FIG. 5 depicts a configuration of SPC control chart of $y_E$ with zero (0) being the baseline value and at the bottom.

The purpose of the BEI scheme 112 is to transform the difference between the actual representative value ($y_T$) of the new workpiece sample and healthy baseline value $\hat{y}_B$ of the new workpiece sample, i.e. $y_E=|y_T-\hat{y}_B|$, into a BEI. Referring to FIG. 5, FIG. 5 depicts a configuration of SPC control chart of $y_E$ with zero (0) being the baseline value and at the bottom. The Spec, (HardSpec-$\bar{y}_T$) and Max $y_E$ are shown on the control chart of $y_E$, indicating a conversion value (Zero_$mapping$) corresponding to $y_E=0$; a conversion value (Spec_$mapping$) corresponding to Spec; a conversion value ((HardSpec-$\bar{y}_T$)_$mapping$) corresponding to (HardSpec-$\bar{y}_T$); and a conversion value (Max $y_{E\_mapping}$) corresponding to Max $y_E$, wherein Zero_$mapping$, Spec_$mapping$, (HardSpec-$\bar{y}_T$)_$mapping$ and Max $y_{E\_mapping}$ are 1, 0.7, 0.3, and 0, respectively. For the throttle valve, Spec and HardSpec are varied with the physical properties of the TD, wherein Spec is 5 and HardSpec is 50, and both value can be defined by those who are skilled in the art. Spec and HardSpec are common technical measures used by the conventional SPC, and thus are further explained herein. When, 1, 0.7, 0.3, and 0 are introduced into Zero_$mapping$, Spec_$mapping$, (HardSpec-$\bar{y}_T$)_$mapping$ and Max $y_{E\_mapping}$ in the formulas (3) in the above, the formulas of converting $y_E$ to BEI are obtained as follows:

when $0 < y_E \leq Spec$, $BEI = 1 - \left(\frac{y_E}{Spec} \times 0.3\right);$ (3')

when $Spec < y_E \leq (HardSpec - \bar{y}_T)$, $$BEI = 0.7 - \left(\frac{y_E - Spec}{(HardSpec - \bar{y}_T) - Spec} \times 0.4\right);$$

when $(HardSpec - \bar{y}_T) < y_E$, $$BEI = 0.3 - \left(\frac{y_E - (HardSpec - \bar{y}_T)}{\text{Max } y_E - (HardSpec - \bar{y}_T)} \times 0.3\right);$$

With the above definitions, the following statements are made:

when Zero_$_{mapping}$ (for example, 1)>BEI>Spec_$_{mapping}$ (for example, 0.7), the target device is healthy and normally operated;

when Spec_$_{mapping}$ (for example, 0.7)>BEI>(HardSpec−$\bar{y}_T$)_$_{mapping}$ (for example, 0.3), the target device is sick and cannot work after remaining useful life (RUL) of the target device is worn out; and when (HardSpec−$\bar{y}_T$)_$_{mapping}$ (for example, 0.3)>BEI>Max $y_{E\_mapping}$ (for example, 0), the target device is dead and needs maintenance immediately.

FDC Logic 120

As shown in the right-hand part of FIG. 2, the FDC logic 120 is used for converting the DHI, BEI and $ISI_B$ values into the healthy status of TD. Before applying the FDC logic 120, the thresholds of DHI, BEI, and $ISI_B$ (denoted by $DHI_T$, $BEI_T$, and $ISI_{B\_T}$, respectively) should be assigned. As shown in FIG. 4 and FIG. 5, the healthy regions of DHI and BEI are between 0.7 and 1; therefore, both $DHI_T$ and $BEI_T$ are assigned to be 0.7. Six times of standard deviations of each individual process parameter is assigned as the threshold of the $ISI_B$; hence, $ISI_{B\_T}$=6. The FDC logic 120 is elaborated as follows.

If DHI≥$DHI_T$ (the result of step 122 is "no") and all $ISI_B$ values are smaller than their corresponding $ISI_{B\_T}$ (the result of step 124 is "yes"), it represents that the target device is healthy and components corresponding to the parameters are normally operated;

if DHI≥$DHI_T$ (the result of step 122 is "no") and at least one of $ISI_B$ values is greater than or equal to its $ISI_{B\_T}$ (the result of step 124 is "no"), it represents that the target device is healthy but at least the related process parameter corresponding to the largest $ISI_B$ is abnormal and should be checked;

if DHI<$DHI_T$ (the result of step 122 is "yes") and BEI≥$BEI_T$ (the result of step 126 is "no"); or DHI<$DHI_T$ (the result of step 122 is "yes") and at least one $ISI_B$ is greater than or equal to its $ISI_{B\_T}$ (the result of step 126 is "no"), it represents that the target device is healthy but the target device is out-of-control (OOC) due to abnormality of the related process parameter corresponding to the largest $ISI_B$ which should be checked; and if DHI<$DHI_T$ (the result of step 122 is "yes") and BEI<$BEI_T$ and all $ISI_B$ values are smaller than their $ISI_{B\_T}$ (the result of step 126 is "yes"), it represents that the target device is abnormal and caused by itself and needs maintenance immediately.

Hereinafter, the procedures for building the TD baseline model 104 and executing the FDC portion are explained.

Please refer to FIG. 2 and FIG. 6 again. After the off-line operation 200 and the on-line operation 210 (FIG. 3A and FIG. 3B) are completed and the $ISI_B$ model 108 is built, step 302 is first performed for collecting a new workpiece sample which is generated when the TD produces a new workpiece, the new workpiece sample corresponding to a set of TD-related process data (X) and an actual representative value ($y_T$) of the target device for producing the new workpiece. Thereafter, step 304 is performed for ensuring if the collection is successful. When the result of step 304 is "no", step 302 is performed again. When the result of step 304 is "yes", step 306 is performed for respectively standardizing the X and $y_T$ of the new workpiece (i.e. the new workpiece sample) by using the standardizing modules 102 and 106, and then adding the standardized X and $y_T$ the new workpiece to the plurality of modeling samples for rebuilding the TD baseline model 104 in accordance with a conjecturing algorithm, wherein the conjecturing algorithm can be, for example, a neural network (NN) algorithm, a multi-regression (MR) algorithm, a support vector machines (VM) algorithm, a partial least Squares (PLS) algorithm or another algorithm with prediction capability. Steps 302 to 306 for constructing the TD baseline model 104 are mainly based on a method for automatic virtual metrology (AVM) disclosed in U.S. Pat. No. 8,095,484, which is hereby incorporated by reference, which has the same assignee with this application.

Further, when the result of step 304 is "yes", this embodiment also performs step 312 for computing the DHI of the new workpiece from the DHI scheme 110. After step 306, step 308 is performed for computing the $\hat{y}_B$ of the new workpiece from the re-built TD baseline model 104; the $ISI_B$ of the new workpiece from the $ISI_B$ module 108; and the BEI of the new workpiece from the BEI scheme 112. After the DHI, $ISI_B$ and BEI of the new workpiece are obtained, step 314 is performed for inferring the healthy status of TD via the FDC logic 120. After step 314, step 310 is performed for deleting the new workpiece sample from the modeling samples, so as to keep the freshness of the original modeling samples. In other words, the so-called "rebuilding" the TD baseline model 104 is to use each time of newly entered workpiece sample and the fixed amount of C&H historical samples as the modeling samples for constructing the TD baseline model 104.

The present invention can not only infer the healthy status of the TD but also forecast the RUL of the TD. Hereinafter, the RUL forecast 130 shown in FIG. 2 is described.

RUL Forecast 130

Figure 7:
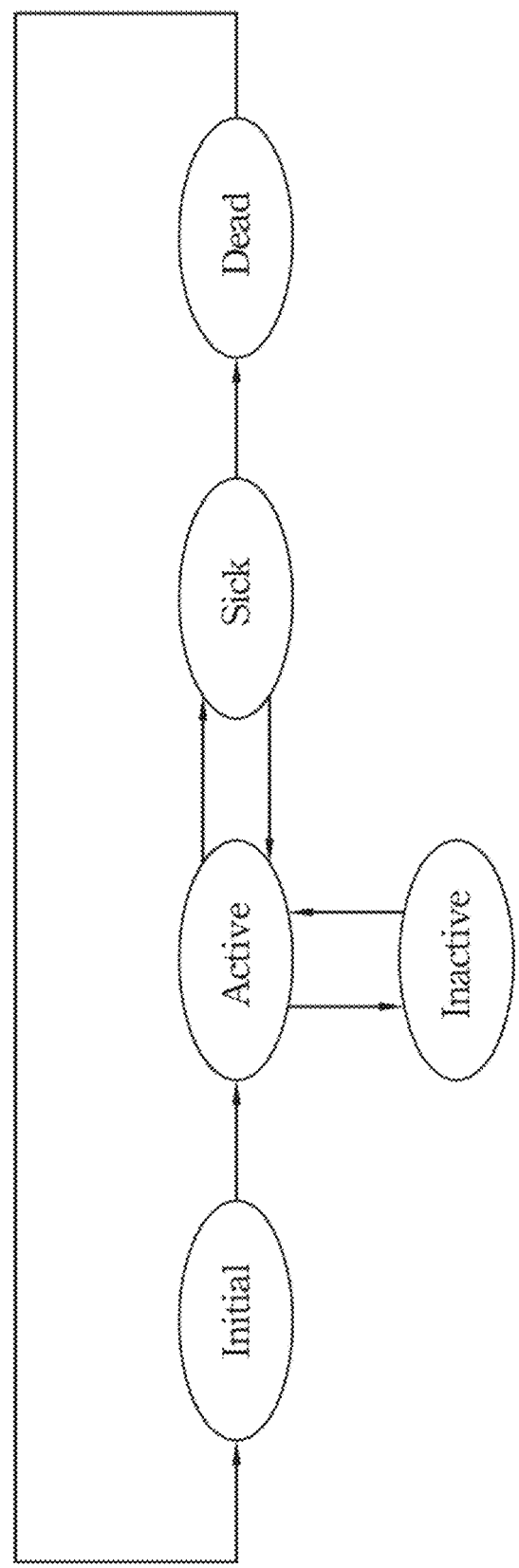
FIG. 7 is a state diagram of a TD used in an embodiment of the present invention.

The RUL forecast 130 includes a detection scheme 132 and a RUL predictive model 134. The detection scheme checks if $y_E$>$y_{E\_S}$, wherein $y_E$=|$y_T$−$\hat{y}_B$| and $y_{E\_S}$ represents the threshold of $y_E$ for detecting the sick state of the TD. Referring to FIG. 7, FIG. 7 is a state diagram of the TD used in an embodiment of the present invention, which includes five states: initial, active, inactive, sick, and dead. The state diagram shown in FIG. 7 is described in the applicant's paper (F.-T. Cheng, C.-L. Wang, H.-C. Yang, S.-L. Wu, and C.-Y. Lo, "A Study on Application Cluster Service Scheme and Computer Performance Evaluator," Journal of the Chinese Institute of Engineers, vol. 31, no. 4, pp. 675-690, June 2008), which is hereby incorporated by reference. Usually, a target device (TD) is in the active state. However, when $y_E$>$y_{E\_S}$, the TD enters the sick state. The TD returns to the active state if $y_E$ is less than $y_{E\_S}$ again. On the contrary, if the sick symptom of the TD becomes worse such that the available resources of the TD are exhausted, the TD enters the dead state or, restated, the TD is down. The above description demonstrates that the major purpose of the detection scheme 132 is to detect whether a target device (TD) is in a sick state. To avoid a false alarm, in this embodiment, two consecutive detections of $y_E$>$y_{E\_S}$ is required to make sure that the TD is entering the sick state. The RUL predictive model 134 will be activated to predict the RUL once the TD is in the sick state.

It is found that failures of a large population of statistically identical and independent electronic items exhibit often a typical bathtub curve with the following 3 phases: (1) early failures, (2) failures with a constant (or nearly so) failure rate, and 3) wear-out failures. Generally, the sick state of a target device (TD) occurs in the wear-out phase. A failure in the wear-out phase is resulted from aging, wear-out, or fatigue, etc., whose failure rate increases exponentially with time. Therefore, a regression-based exponential-curve-fitting (ECF) is adopted in this embodiment to implement the RUL predictive model 134.

Figure 8:
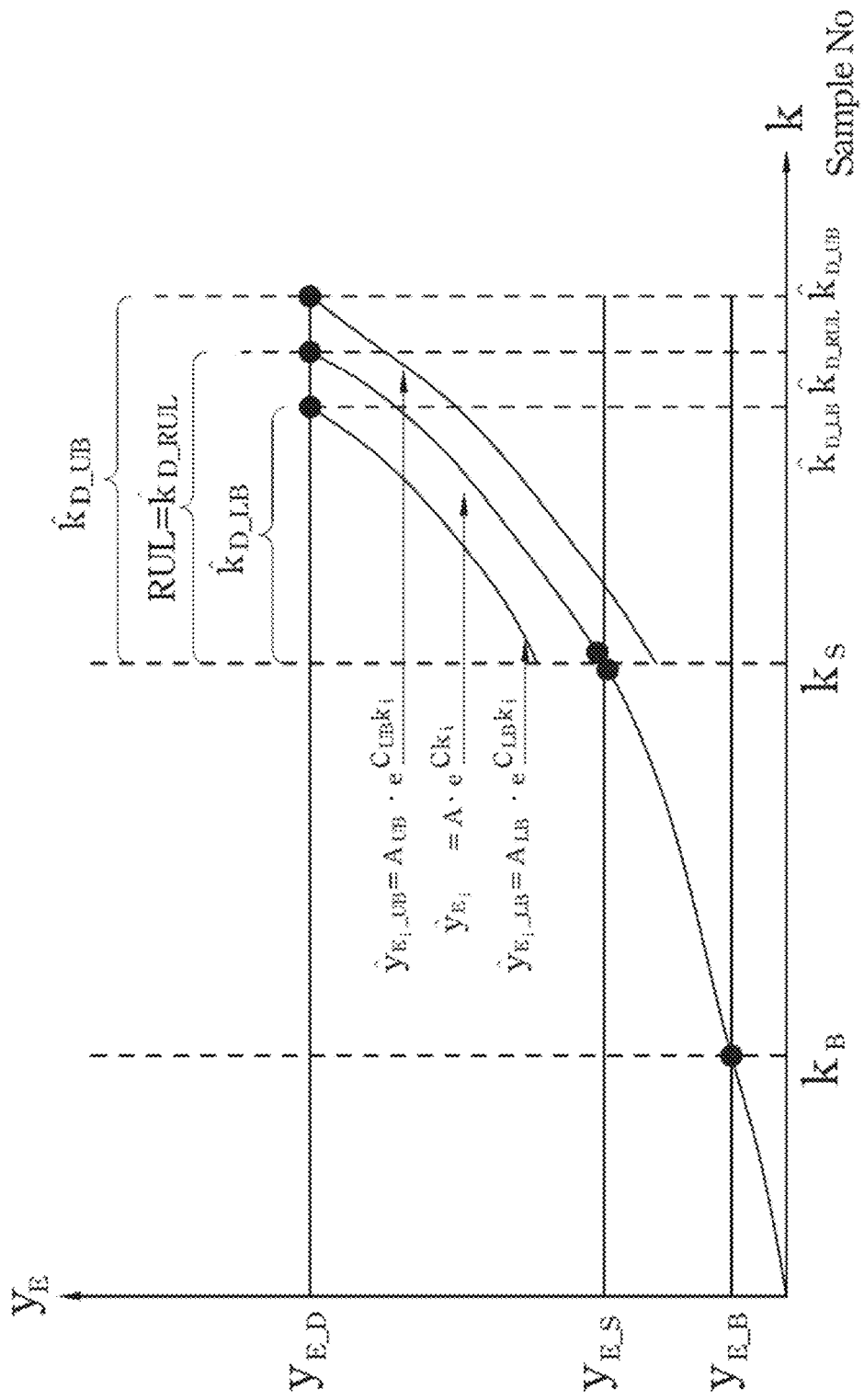
FIG. 8 is a schematic diagram for explaining the operation of a RUL predictive model according to an embodiment of the present invention.

Referring to FIG. 8, FIG. 8 is a schematic diagram for explaining the operation of the RUL predictive model 134 according to an embodiment of the present invention. At first, $y_{E\_B}=\bar{y}_E+3\sigma_{y_E}$ is defined, where $\bar{y}_E$ and $\sigma_{y_E}$ represent the mean and standard deviation of $y_E$ of the healthy baseline samples collected just after the TD has been through maintenance. Also, let $y_{E\_S}$ and $y_{E\_D}$ stand for the values of $y_E$ when the TD enters the sick and dead states, respectively. As shown in FIG. 5, $y_{E\_S}$=Spec and $y_{E\_D}$=HardSpec-$\bar{y}_T$.

The operation steps of the RUL predictive model 134 are explained below.

Step 1: Calculate $y_{E\_B}$ and find $k_B$ which is the sample number corresponding to $y_{E\_B}$. Then, define $y_{E\_D}$, and $y_{E\_S}$.

Step 2: If the condition of two consecutive detections of $y_E > y_{E\_S}$ is confirmed, then the TD is entering the sick state and the flow jumps to Step 3.

Step 3: Collect all of the samples between $y_{E\_B}$ and $y_{E\_S}$ and apply the ECF formula to obtain the wear-out failure equation:

$$\hat{y}_{E_i} = A \cdot e^{Ck_i}, i = B, B+1, \ldots, S \qquad (4)$$

$$C = \frac{\sum_{i=B}^{S}(k_i - \bar{k})[\ln(y_{E_i}) - \overline{\ln(y_E)}]}{\sum_{i=B}^{S}(k_i - \bar{k})^2} \qquad (5)$$

$$A = e^{\overline{\ln(y_E)} - C\bar{k}} \qquad (6)$$

$$\bar{k} = \frac{\sum_{i=B}^{S} k_i}{k_S - k_B + 1} \qquad (7)$$

$$\overline{\ln(y_E)} = \frac{\sum_{i=B}^{S} \ln(y_{E_i})}{k_S - k_B + 1} \qquad (8)$$

where $k_i$ is the $i^{th}$ sample number; $\hat{y}_{E_i}$ is the $i^{th}$ $y_E$ predictive value corresponding to $k_i$; $y_{E_i}$ is the $i^{th}$ $y_E$ actual value corresponding to $k_i$; $k_B$ is the $B^{th}$ sample number corresponding to $y_{E\_B}$; and $k_S$ is the $S^{th}$ sample number corresponding to $y_{E\_S}$.

After obtaining the wear-out failure equation, $\hat{y}_{E_i}=A \cdot e^{Ck_i}$, the upper-bound (UB) equation, $\hat{y}_{E_i\_UB}=A_{UB} \cdot e^{C_{UB}k_i}$, and lower-bound (LB) equation, $\hat{y}_{E_i\_LB}=A_{LB} \cdot e^{C_{LB}k_i}$, are also derived as follows.

Step 4: Apply the failure equation, $\hat{y}_{E_i}=A \cdot e^{Ck_i}$, to predict the $\hat{y}_{E_i}$ values started from $k_i=k_{S+1}$ until the $\hat{y}_{E_i}$ value is equal to or greater than the $y_{E\_D}$ value; its corresponding sample number is denoted as $\hat{k}_{D\_RUL}$. Then, utilize the two-side 95% prediction-interval (PI) formula to calculate all the 95% UB and LB values from $k_i=k_{S+1}$ till $\hat{k}_{D\_RUL}$ with $$\hat{y}_{E_i\_UB_{S+j}} = \hat{y}_{E_{S+j}} - \Delta_{S+j}, j = [1, 2, \ldots, D\_RUL-S] \qquad (9)$$

$$\hat{y}_{E_i\_LB_{S+j}} = \hat{y}_{E_{S+j}} + \Delta_{S+j}, j = [1, 2, \ldots, D\_RUL-S] \qquad (10)$$

$$\Delta_{S+j} = t_{\frac{\alpha}{2}}(k_S - k_B + 1 - p)\sqrt{s_{y_E}^2 \times [1 + (k_{S+j})^2 (K^T K)^{-1}]} \qquad (11)$$

$$s_{y_E} = \frac{\sum_{i=B}^{S}(\hat{y}_{E_i} - \bar{y}_E)}{k_S - k_B + 1} \qquad (12)$$

$$\bar{y}_E = \frac{\sum_{i=B}^{S} y_{E_i}}{k_S - k_B + 1} \qquad (13)$$

where $K=[k_B, k_{B+1}, \ldots, k_S]^T$;
$\hat{y}_{E_i\_UB_{S+j}}$ is the predictive $S+j^{th}$ UB value;
$\hat{y}_{E_i\_LB_{S+j}}$ is the predictive $S+j^{th}$ LB value;
$\hat{k}_{D\_RUL}$ is the predictive sample number corresponding to $y_{E\_D}$;
$\Delta_{S+j}$ is the 95% PI value corresponding to the $S+j^{th}$ sample;

$$t_{\frac{\alpha}{2}}(k_S - k_B + 1 - p)$$

is a t-distribution with $k_S-k_B+1-p$ degrees of freedom with p being the number of parameters and $\alpha$=0.05.

After obtaining all the 95% UB and LB values from $k_i=k_{S+1}$ till $\hat{k}_{D\_RUL}$, the UB equation $$\hat{y}_{E_i\_UB}=A_{UB} \cdot e^{C_{UB}k_i} \qquad (14)$$

and the LB equation $$\hat{y}_{E_i\_LB}=A_{LB} \cdot e^{C_{LB}k_i} \qquad (15)$$

can then be derived by the same ECF formula and approaches that were applied to obtain the failure equation: $\hat{y}_{E_i}=A \cdot e^{Ck_i}$.

Step 5: Apply the failure, UB, and LB equations (4), (14), and (15)) to find RUL, $\hat{K}_{D\_UB}$, and $\hat{K}_{D\_LB}$ that are corresponding to $y_{E\_D}$ with $$\text{RUL}=\hat{K}_{D\_RUL}=\hat{k}_{D\_RUL}-k_S \qquad (16)$$

$$\hat{K}_{D\_UB}=\hat{k}_{D\_UB}-k_S \qquad (17)$$

$$\hat{K}_{D\_LB}=\hat{k}_{D\_LB}-k_S \qquad (18)$$

wherein $\hat{k}_{D\_RUL}$ is the D_RUL$^{th}$ sample number corresponding to $y_{E\_D}$;
$\hat{k}_{D\_UB}$ is the D_UB$^{th}$ sample number corresponding to $y_{E\_D}$;
$\hat{k}_{D\_LB}$ is the D_LB$^{th}$ sample number corresponding to $y_{E\_D}$.

The aforementioned embodiments can be provided as a computer program product, which may include a machine-readable medium on which instructions are stored for programming a computer (or other electronic devices) to perform a process based on the embodiments of the present invention. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present invention also can be downloaded as a computer program product, which may be transferred from a remote computer to a requesting computer by using data signals via a communication link (such as a network connection or the like).

Hereinafter, an application example is used for explaining the present invention.

Three cases of a throttle valve in a vacuum module of a PECVD tool for solar-cell manufacturing are adopted in the application examples. As such, the throttle valve is the TD in the application example. Based on the domain knowledge, the angle of the TD may be affected by the following related parameters: $NH_3$, $SiH_4$, Pressure and Radio-Frequency (RF) Power.

The steps shown in FIG. 3A and FIG. 6 are used to collect the important samples needed for creating the TD baseline model. In this example, the angle of the TD (throttle valve) is designated as $y_T$ while its related process data (X) containing $NH_3$, $SiH_4$, Pressure, and RF Power. Since the number of the related process data is four, about 40 samples are required for building the TD baseline model. As such, the DMW scheme is performed off-line on 2602 healthy historical samples to select about 30 C&H ones. Then, just after maintenance, the on-line operation is activated to collect 10 fresh samples. The 30 C&H historical samples, the 10 fresh samples and each time of new workpiece sample collected are used as the modeling samples for creating the TD baseline model, wherein each of the modeling samples includes $y_T$ and X corresponding thereto. The 10 fresh samples are adopted for constructing the $ISI_B$ model and the DHI scheme as well as the $y_{E\_B}$ value.

In this application example, the Min $y_T$, LSL, LCL, $\bar{y}_T$, UCL, USL and Max $y_T$ of this example for converting $y_T$ to DHI are 0, 5, 22, 27, 32, 50 and 90, respectively. Also, the Spec, HardSpec-$\bar{y}_T$ and Max $y_E$ for transforming $y_E$ to BEI are 5, 23 and 63, respectively.

The maximal allowable deviation of each parameter in the TD related process data (X) is 10% of each individual nominal value. Therefore, by assigning 10% of each individual nominal value to be equivalent to 6 of the $ISI_B$ value, the value of $ISI_{B\_T}$ is equal to 6. Moreover, both $DHI_T$ and $BEI_T$ are assigned to be 0.7 that is the threshold for the TD to enter the sick state.

Figure 9:
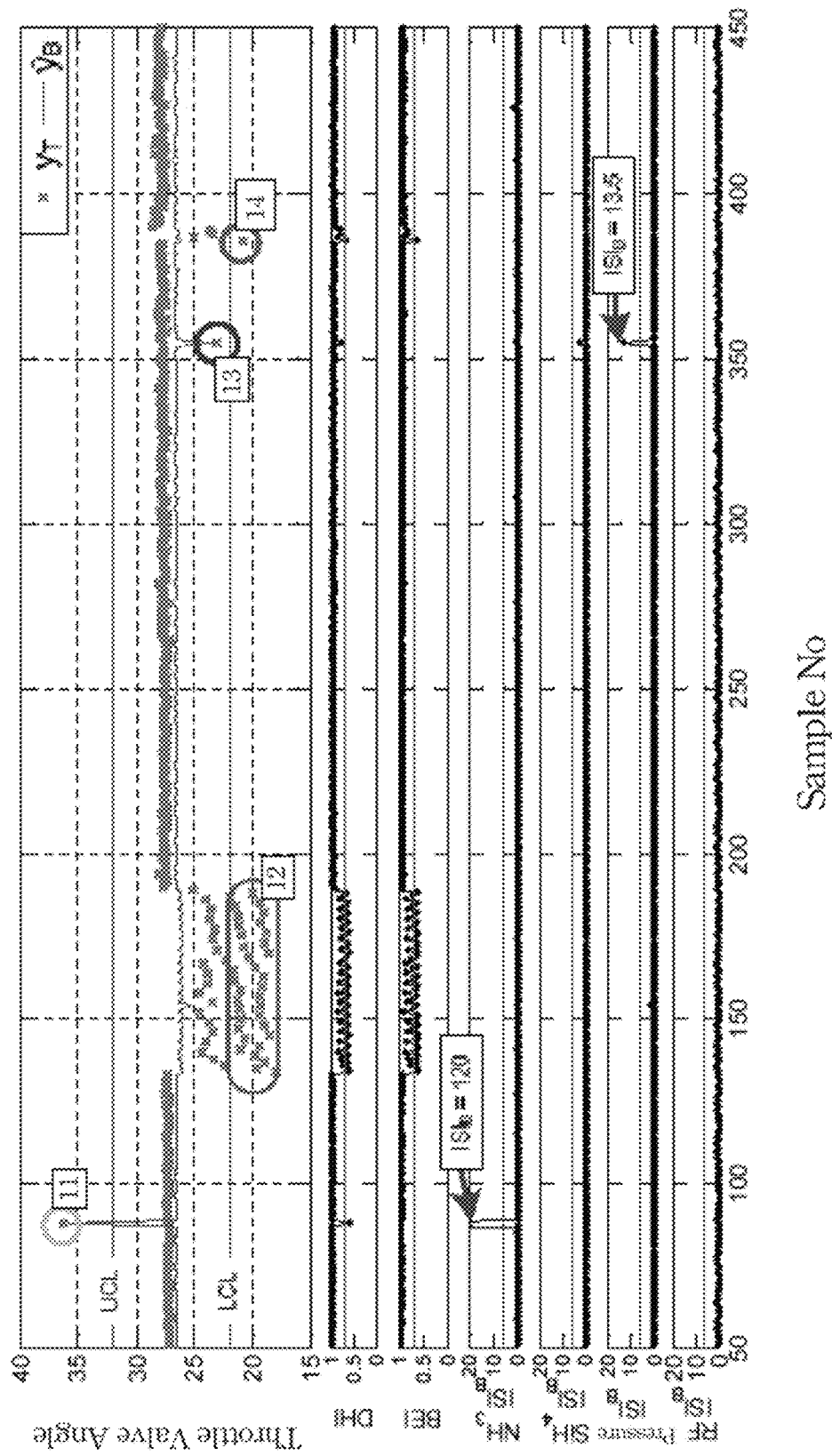
FIG. 9 shows the results of running a FDC portion of the BPM method.

The 450 testing samples used in the example illustrated in FIG. 1 are re-utilized for easy comparison. The results of running the FDC portion of the BPM method are shown in FIG. 9. In FIG. 9, besides $y_T$, the healthy baseline ($\hat{y}_B$) of the TD is also displayed. Furthermore, DHI, BEI and the $ISI_B$ values of all the related parameters: $NH_3$, $SiH_4$, Pressure, and RF Power are also shown below the $y_T$ and $\hat{y}_B$ results. Observing the sample in circles 11 of FIG. 9, its DHI<$DHI_T$ and the $ISI_B$ (=120) of $NH_3$ is larger than its corresponding $ISI_{B\_T}$ (=6); therefore it means that the TD itself is healthy; while the reason for its OOC is due to the glitch occurs in the related $NH_3$, which should be checked.

All of the samples within circles 12 and 14 satisfy the conditions that DHI<$DHI_T$ and BEI<$BEI_T$ as well as all $ISI_B$ values of these samples are smaller than their corresponding $ISI_{B\_T}$, hence the TD is abnormal and the abnormality is caused by itself.

The sample in circle 13 meets the conditions of DHI>$DHI_T$ as well as the $ISI_B$ value (=13.5) of Pressure are larger than $ISI_{B\_T}$, thus it implies that the TD is normal but Pressure is abnormal and should be checked.

Figure 10:
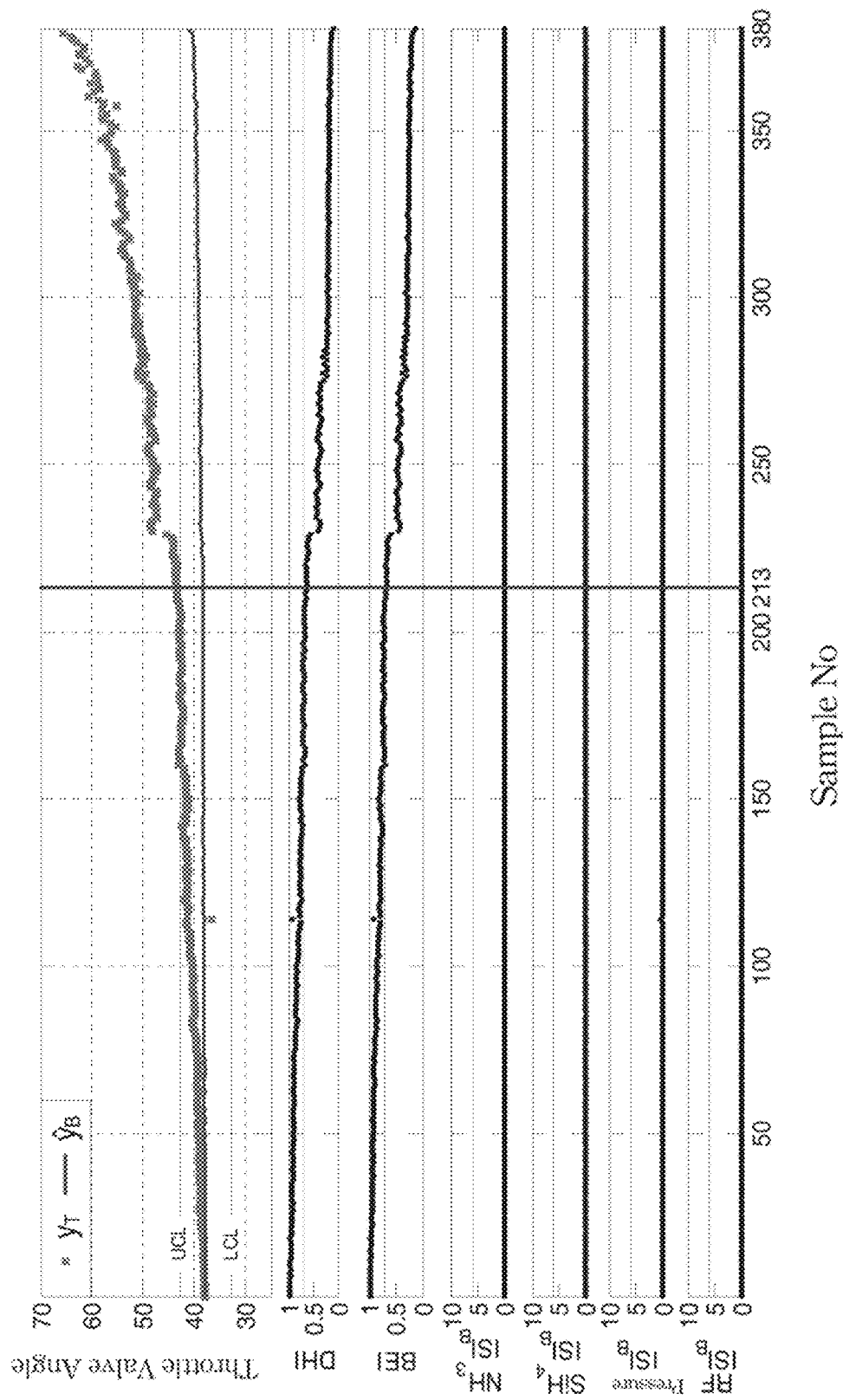
FIG. 10 shows all the BPM related data and indexes in an entire PM period according to an application example of the present invention.

Referring to FIG. 10, FIG. 10 shows all the BPM related data and indexes in an entire PM period according to the application example of the present invention. The entire PM period containing 390 samples is adopted in this application example. Thirty C&H samples are collected and included in the modeling samples. The first 10 fresh samples are utilized for constructing the $ISI_B$ model and DHI scheme as well as the $y_{E\_B}$ value. The following 380 samples with the BPM related data and indexes are computed form the respective models of the present invention. As depicted in FIG. 10, the angles ($y_T$) of the TD increase gradually due to the aging effect; while the baseline values ($\hat{y}_B$) are relatively flat due to the fact that their related process data: $NH_3$, $SiH_4$, Pressure, and RE Power are stable with little variations. The conditions of DHI<$DHI_T$ and BEI<$BEI_T$ with all $ISI_B$ values being smaller than their corresponding $ISI_{B\_T}$ occur at around the $213^{th}$ sample that is the entry point of the sick state. This event activates the RUL predictive process. After performing the aforementioned operation steps of the RUL predictive model, it is found that RUL=60; $\hat{K}_{D\_UB}$=68; $\hat{K}_{D\_LB}$=48, i.e. the RUL of the TD is 60 sample periods, wherein each sample period used in this application is about 1 hour. In fact, the actual sample number of the TD entering the dead state is 289. As a result, the actual RUL is 289−213=76 sample periods. As such, the present invention may forecast the RUL of the TD with a certain degree of accuracy.

Figure 11:
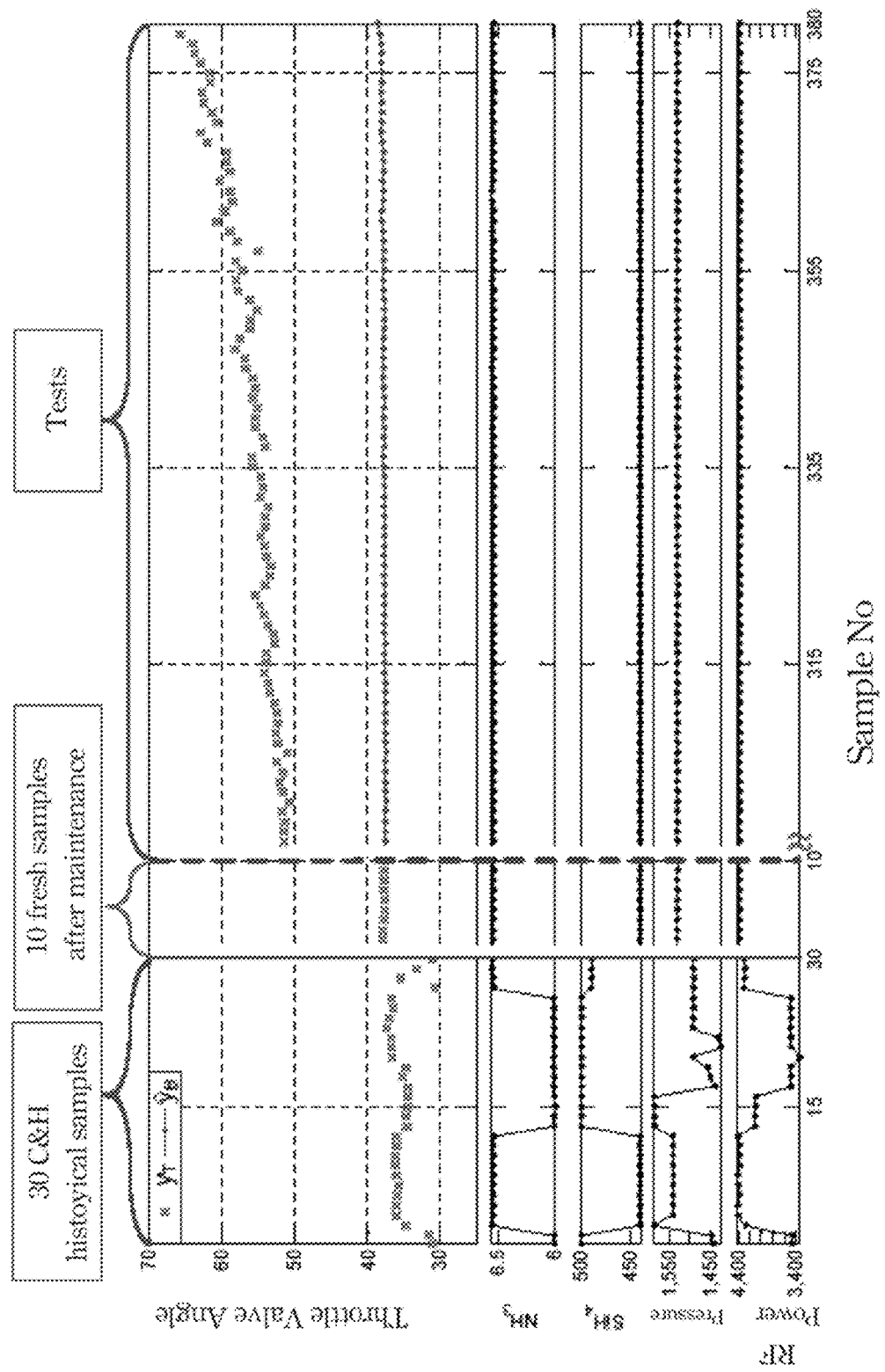
FIG. 11 shows the BPM related data and indexes with the C&H historical samples in the entire PM period according to the application example of the present invention.
Figure 12:
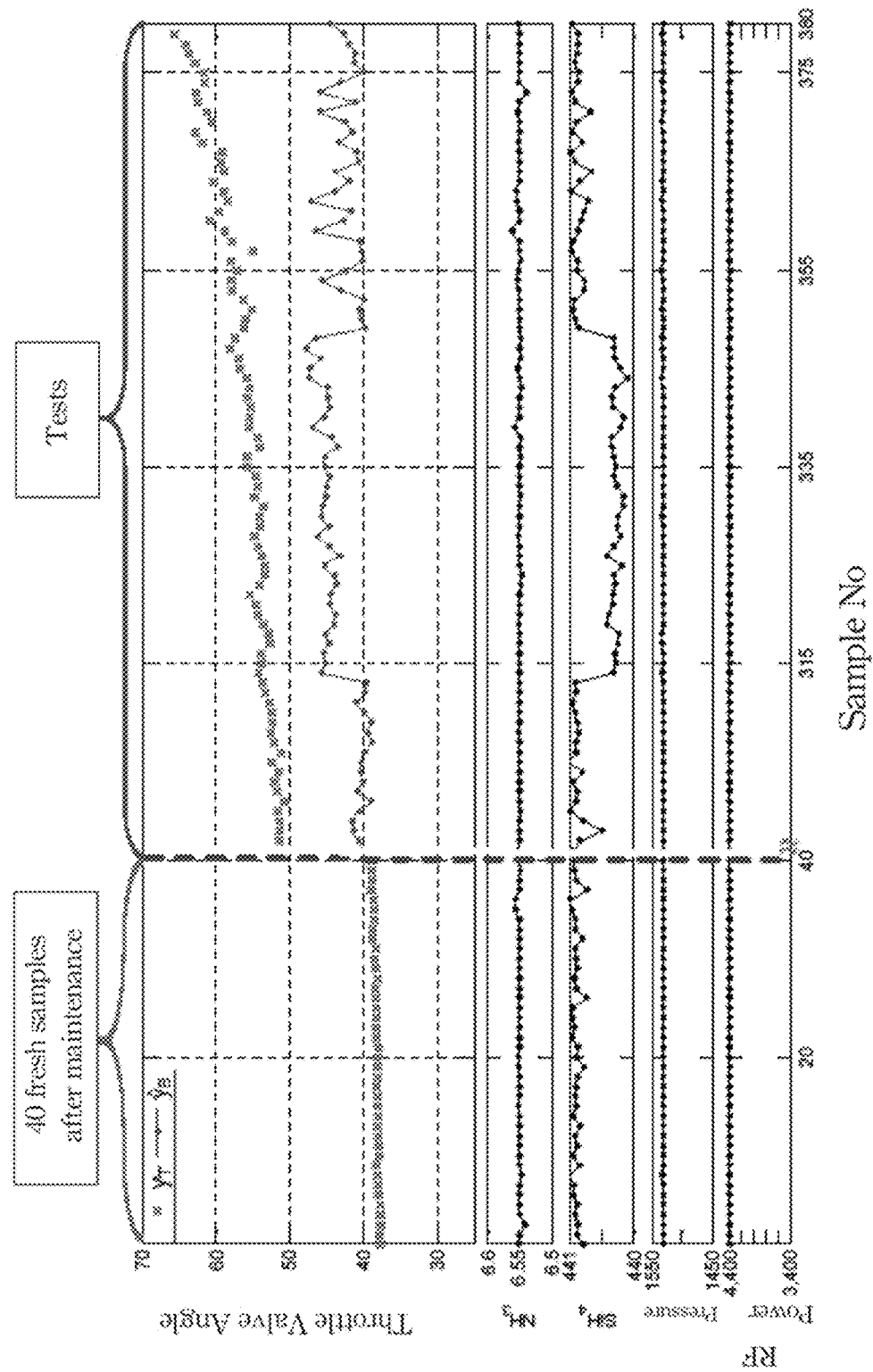
FIG. 12 shows the BPM related data and indexes without the C&H historical samples in the entire PM period according to the application example of the present invention.

The below description further explains the necessity of adopting the C&H historical samples to build the TD baseline model for enlarging the operating space of the BPM scheme and to depress the noises of the modeling samples, thereby increasing prediction accuracy. Referring to FIG. 11 and FIG. 12, FIG. 11 shows the BPM related data and indexes with the C&H historical samples in the entire PM period according to the application example of the present invention; and FIG. 12 shows the BPM related data and indexes without the C&H historical samples in the entire PM period according to the application example of the present invention. That is, in FIG. 11, 30 C&H samples and 10 fresh samples collected just after TD maintenance are adopted as the modeling samples; while in FIG. 12, 40 fresh samples collected just after TD maintenance are adopted for modeling without any C&H historical samples. The angles ($y_T$) of the TD together with the baseline values ($\hat{y}_B$) as well as their related process data ($NH_3$, $SiH_4$, Pressure, and RF Power) of the $296^{th}$ to $380^{th}$ samples are displayed. Comparing the baseline values ($\hat{y}_B$) in the testing runs of FIG. 11 and FIG. 12, apparently, the ones in FIG. 12 are relatively rough, which are incorrect. The reason is due to the fact that FIG. 11 modeling samples contain 30 C&H historical samples while FIG. 12 does not. As shown in the left portions of FIG. 11 and FIG. 12, the peak-to-peak variations of all the TD related process data of FIG. 11 are much higher than those of FIG. 12. As a result, the representativeness of the operating space of the case of FIG. 12 is rather weak. Therefore, it is clear that the C&H historical samples are required for modeling.

It can be known from the above that, with the application of the embodiments of the present invention, the healthy status of the TD can be effectively inferred and remaining useful life (RUL) of the TD can be forecasted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A baseline predictive maintenance method, comprising:
monitoring a characteristic of a target device and a plurality of processing parameters related to the target device when the target device is processing a plurality of workpieces just after one maintenance has been performed on the target device, thereby obtaining a plurality of fresh samples, the target device including a throttle valve of a plasma-enhanced-chemical-vapordeposition (PECVD) tool or a device of production equipment, the characteristic including an angle of the throttle valve or an operating parameter of the device, the processing parameters including pressure and RF power of the PECVD tool or related parameters of the production equipment, wherein the fresh samples are related to the target device and are generated when the target device produces the workpieces respectively, and the fresh samples are corresponding to the workpieces in a one-to-one manner;

monitoring the characteristic of the target device and the processing parameters related to the target device when the target device is processing a new workpiece after the workpieces have been processed, thereby collecting a new workpiece sample, wherein the new workpiece sample is related to the target device and is generated when the target device produces the new workpiece, each of the fresh samples and the new workpiece sample comprising a set of paired data, the set of paired data consisting of a set of TD-related process data (X) and an actual value of the characteristic of the target device, the set of TD-related process data (X) comprising values of the processing parameters, wherein the target device is operated at one of the actual values of the characteristic of the target device and the values of the processing parameters are adopted by the production equipment when the target device is producing each of the workpieces and the new workpiece;

building a TD baseline model by using a plurality of modeling samples in accordance with a conjecturing algorithm, wherein the modeling samples include the new workpiece sample and the fresh samples; and using the TD baseline model to compute a healthy baseline value ($\hat{y}_B$), wherein the healthy baseline value ($\hat{y}_B$) is a predicted value of the characteristic at which the target device should be operated when the target device is healthy and is producing the new workpiece; and based on the healthy baseline value ($\hat{y}_B$), performing fault-detection-and-classification on the target device, and performing another maintenance on the target device if the actual value of the characteristic of the target device in the new workpiece sample is deviated from the healthy baseline value of the target device by a threshold value when processing the new workpiece.

2. The baseline predictive maintenance method as claimed in claim 1, wherein the conjecturing algorithm is a neural network (NN) algorithm, a multi-regression (MR) algorithm, a support vector machines (VM) algorithm or a partial least Squares (PLS) algorithm.

3. The baseline predictive maintenance method as claimed in claim 1, further comprising:

converting the actual value ($y_T$) of the characteristic of the target device in the new workpiece sample to a device health index (DHI) in accordance with a set of first conversion formulas as follows and performing the fault-detection-and-classification on the target device by using the DHI:

when $\bar{y}_T < y_T < UCL$, $$DHI = \bar{y}_{T\_mapping} - \left(\frac{y_T - \bar{y}_T}{UCL - \bar{y}_T} \times (\bar{y}_{T\_mapping} - UCL_{\_mapping})\right);$$

when $UCL < y_T < USL$, $$DHI = UCL_{\_mapping} - \left(\frac{y_T - UCL}{USL - UCL} \times (UCL_{\_mapping} - USL_{\_mapping})\right);$$

when $USL < y_T < \text{Max } y_T$, $$DHI = USL_{\_mapping} - \left(\frac{y_T - USL}{\text{Max } y_T - USL} \times (USL_{\_mapping} - \text{Max } y_{T\_mapping})\right);$$

when $LCL < y_T < \bar{y}_T$, $$DHI = \bar{y}_{T\_mapping} - \left(\frac{y_T - \bar{y}_T}{\bar{y}_T - LCL} \times (\bar{y}_{T\_mapping} - LCL_{\_mapping})\right);$$

when $LSL < y_T < LCL$, $$DHI = LCL_{\_mapping} - \left(\frac{LCL - y_T}{LCL - LSL} \times (LCL_{\_mapping} - LSL_{\_mapping})\right);$$

when $\text{Min } y_T < y_T < LSL$, $$DHI = LSL_{\_mapping} - \left(\frac{LSL - y_T}{LSL - \text{Min } y_T} \times (\text{Min } y_{T\_mapping} - LSL_{\_mapping})\right);$$

wherein $\bar{y}_T$ represents a mean of the actual values of the characteristic of the target device in the fresh samples, and $\bar{y}_{T\_mapping}$ is a conversion value corresponding to $\bar{y}_T$;

Max $y_T$ represents the maximum value of the actual values of the characteristic in the fresh samples, and Max $y_{T\_mapping}$ is a conversion value corresponding to Max $y_T$;

Min $y_T$ represents the minimum value of the actual values of the characteristic in the fresh samples, and Min $y_{T\_mapping}$ is a conversion value corresponding to Min $y_T$;

LSL is a lower specification limit; LCL is a lower control limit; USL is an upper specification limit; UCL is an upper control limit; LSL_$_{mapping}$ is a conversion value corresponding to the LSL; LCL_$_{mapping}$ is a conversion value corresponding to the LCL; USL_$_{mapping}$ is a conversion value corresponding to the USL; and UCL_$_{mapping}$ is a conversion value corresponding to the UCL.

4. The baseline predictive maintenance method as claimed in claim 3, wherein when $\bar{y}_{T\_mapping} > DHI > UCL_{\_mapping}$ (or $\bar{y}_{T\_mapping} > DHI > LCL_{\_mapping}$), the target device is healthy and normally operated;

when $UCL_{\_mapping} > DHI > USL_{\_mapping}$ (or $LCL_{\_mapping} > DHI > LSL_{\_mapping}$), the target device is sick and cannot work after remaining useful life (RUL) of the target device is worn out; and when $USL_{\_mapping} > DHI > \text{Max } y_{T\_mapping}$ (or $LSL_{\_mapping} > DHI > \text{Min } y_{T\_mapping}$), the target device is dead and needs maintenance immediately.

5. The baseline predictive maintenance method as claimed in claim 3, further comprising:

converting the actual value ($y_T$) of the characteristic of the target device in the new workpiece sample and the healthy baseline value ($\hat{y}_B$) of the target device producing the new workpiece to a baseline error index (BEI) in accordance with a set of second conversion formulas as follows and performing the fault-detection-and-classification on the target device by using the BEI:

$$y_E = |y_T - \hat{y}_B|;$$

when $0 < y_E \leq Spec$, $BEI = Zero_{\_mapping} - \left(\frac{y_E}{Spec} \times Spec_{\_mapping}\right);$ when $Spec < y_E \leq (HardSpec - \bar{y}_T)$, $$BEI = Spec_{\_mapping} - \left(\frac{\frac{y_E - Spec}{(HardSpec - \bar{y}_T) - Spec} \times}{(Spec_{\_mapping} - (HardSpec - \bar{y}_T)_{\_mapping})}\right);$$

when $(HardSpec - \bar{y}_T) < y_E$,

-continued $$BEI = (HardSpec - \bar{y}_T)_{\_mapping} - \left( \frac{y_E - (HardSpec - \bar{y}_T)}{\text{Max } y_E - (HardSpec - \bar{y}_T)} \times \left( (HardSpec - \bar{y}_T)_{\_mapping} - \text{Max } y_{E\_mapping} \right) \right);$$

wherein Spec represents a specification of the target device; HardSpec represents a hard specification of the target device; Max $y_E$ represents the maximum allowable $y_E$ of the fresh samples after conversion; Zero$_{\_mapping}$ represents a conversion value corresponding to when $y_E$=0; Spec$_{\_mapping}$ represents a conversion value corresponding to Spec; represents a conversion value corresponding to; Max $y_{E\_mapping}$ represents a conversion value corresponding to Max $y_E$.

6. The baseline predictive maintenance method as claimed in claim 5, wherein
when Zero$_{\_mapping}$>BEI>Spec$_{\_mapping}$, the target device is healthy and normally operated;
when Spec$_{\_mapping}$>BEI>(HardSpec-$\bar{y}_T)_{\_mapping}$, the target device is sick and cannot work after remaining useful life (RUL) of the target device is worn out; and
when (HardSpec-$\bar{y}_T)_{\_mapping}$>BEI>Max $y_{E\_mapping}$, the target device is dead and needs maintenance immediately.

7. The baseline predictive maintenance method as claimed in claim 5, further comprising:
computing the mean and standard deviation of the values of each of the processing parameters in the sets of TD-related process data (X) of the fresh samples and performing a standardization procedure therewith, thereby obtaining a baseline individual similarity index (ISI$_B$) of each of the processing parameters in the set of TD-related process data (X) of the new workpiece sample.

8. The baseline predictive maintenance method as claimed in claim 7, wherein
if DHI≥DHI$_T$ and the ISI$_B$ of each of the processing parameters in the set of TD-related process data (X) of the new workpiece sample is smaller than its ISI$_{B\_T}$, it represents that the target device is healthy and the processing parameters corresponding to the target device are normally operated;
if DHI≥DHI$_T$ and at least one of the baseline individual similarity indexes (ISI$_B$) of the parameters in the set of TD-related process data (X) of the new workpiece sample is greater than or equal to its ISI$_{B\_T}$, it represents that the target device is healthy but at least one of the processing parameters corresponding to the target device is abnormal and should be checked;
if DHI<DHI$_T$ and BEI≥BEI$_T$; or DHI<DHI$_T$ and at least one of the baseline individual similarity indexes (ISI$_B$) of the processing parameters in the set of TD-related process data (X) of the new workpiece sample is greater than or equal to its ISI$_{B\_T}$, it represents that the target device is healthy but the target device is out-of-control (OOC) due to abnormality of at least one of the processing parameters corresponding to the target device which should be checked; and
if DHI<DHI$_T$ and BEI<BEI$_T$ and the ISI$_B$ of each of the processing parameters in the set of TD-related process data (X) of the new workpiece sample is smaller than its ISI$_{B\_T}$, it represents that the target device is abnormal and caused by itself and needs maintenance immediately; wherein DHI$_T$ is a threshold value of DHI, and ISI$_{B\_T}$ is a threshold value of ISI$_B$.

9. The baseline predictive maintenance method as claimed in claim 1, further comprising:
monitoring the characteristic of the target device and the processing parameters related to the target device when the target device is processing a next new workpiece after the new workpiece has been processed, thereby collecting a next new workpiece sample, wherein the next new workpiece sample is related to the target device and is generated when the target device produces the next new workpiece, and the next new workpiece sample has the same elements as the new workpiece sample;
adding the next new workpiece sample to the modeling samples and then rebuilding the TD baseline model by using the modeling samples in accordance with the conjecturing algorithm;
using the TD baseline model to compute another healthy baseline value ($\hat{y}_B$) of the target device for processing the next new workpiece;
computing $y_E=|y_T-\hat{y}_B|$ of the new workpiece sample and $y_E=|y_T-\hat{y}_B|$ of the next new workpiece sample; and
if the $y_E$ of the new workpiece sample and the $y_E$ of the next new workpiece sample both are greater than a threshold value, predicting remaining useful life (RUL) of the target device by using a predictive algorithm.

10. The baseline predictive maintenance method as claimed in claim 9, wherein the predictive algorithm is a curve fitting method or a time-series forecasting method.

11. The baseline predictive maintenance method as claimed in claim 10, wherein the curve fitting method is a linear curve fitting (LCF) method or an exponential curve fitting (ECF) method, and the time-series forecasting method is an auto-regressive integrated moving average (ARIMA) method.

12. The baseline predictive maintenance method as claimed in claim 1, further comprising:
collecting a plurality of historical samples which are healthy and generated by the target device, wherein the historical samples is generated when the target device is under the healthy status and produces a plurality of historical workpieces; and
adding the historical samples to the modeling samples.

13. The baseline predictive maintenance method as claimed in claim 12, further comprising:
selecting a plurality of concise and healthy historical samples from the historical samples.

14. The baseline predictive maintenance method as claimed in claim 12, further comprising:
selecting a plurality of concise and healthy historical samples from he historical samples by using a dynamic moving window (DMW) method.

15. The baseline predictive maintenance method as claimed in claim 1, further comprising:
deleting the new workpiece sample from the modeling samples.

16. A computer program product stored on a non-transitory tangible computer readable recording medium, which, when executed, performs a baseline predictive maintenance method, the baseline predictive maintenance method comprising:
obtaining a plurality of fresh samples which are generated when the target device (TD) produces a plurality of workpieces respectively just after one maintenance has been performed on the target device, wherein the fresh samples are related to the target device and corresponding to the workpieces in a one-to-one manner, the target device including a throttle valve of a plasma-enhancedchemical-vapor-deposition (PECVD) tool, a characteristic of the target device including an angle of the throttle valve or an operating parameter of the device, the processing parameters including pressure and RF power of the PECVD tool or related parameters of the production equipment;

obtaining a new workpiece sample which is generated when the target device produces a new workpiece after the workpieces have been processed, each of the fresh samples and the new workpiece sample comprising a set of paired data, the set of paired data consisting of a set of TD-related process data (X) and an actual value of the characteristic of the target device, the set of TD-related process data (X) comprising values of the processing parameters, wherein the target device is operated at one of the actual values of the characteristic and the values of the processing parameters are adopted by the production equipment when the target device is processing each of the workpieces and the new workpiece;

building a TD baseline model by using a plurality of modeling samples in accordance with a conjecturing algorithm, wherein the modeling samples include the new workpiece sample and the fresh samples; and using the TD baseline model to compute a healthy baseline value ($\hat{y}_B$), wherein the healthy baseline value ($\hat{y}_B$) is a predicted value of the characteristic at which the target device should be operated when the target device is healthy and is processing the new workpiece; and based on the healthy baseline value ($\hat{y}_B$), performing fault-detection-and-classification on the target device, and initiating another maintenance on the target device if the actual value of the characteristic of the target device in the new workpiece sample is deviated from the healthy baseline value of the target device by a threshold value when processing the new workpiece.

17. The computer program product as claimed in claim 16, wherein the conjecturing algorithm is a neural network (NN) algorithm, a multi-regression (MR) algorithm, a support vector machines (VM) algorithm or a partial least Squares (PLS) algorithm.

18. The computer program product as claimed in claim 16, the baseline predictive maintenance method further comprising:

converting the actual value ($y_T$) of the characteristic of the target device in the new workpiece sample to a device health index (DHI) in accordance with a set of first conversion formulas as follows and performing the fault-detection-and-classification on the target device by using the DHI:

when $\bar{y}_T < y_T < UCL$, $DHI = \bar{y}_{T\_mapping} - \left(\frac{y_T - \bar{y}_T}{UCL - \bar{y}_T} \times (\bar{y}_{T\_mapping} - UCL_{\_mapping})\right)$;

when $UCL < y_T < USL$, $DHI = UCL_{\_mapping} - \left(\frac{y_T - UCL}{USL - UCL} \times (UCL_{\_mapping} - USL_{\_mapping})\right)$;

when $USL < y_T < \text{Max } y_T$, $DHI = USL_{\_mapping} - \left(\frac{y_T - USL}{\text{Max } y_T - USL} \times (USL_{\_mapping} - \text{Max } y_{T\_mapping})\right)$;

-continued when $LCL < y_T < \bar{y}_T$, $DHI = \bar{y}_{T\_mapping} - \left(\frac{\bar{y}_T - y_T}{\bar{y}_T - LCL} \times (\bar{y}_{T\_mapping} - LCL_{\_mapping})\right)$;

when $LSL < y_T < LCL$, $DHI = LCL_{\_mapping} - \left(\frac{LCL - y_T}{LCL - LSL} \times (LCL_{\_mapping} - LSL_{\_mapping})\right)$;

when $\text{Min } y_T < y_T < LSL$, $DHI = LSL_{\_mapping} - \left(\frac{LSL - y_T}{LSL - \text{Min } y_T} \times (\text{Min } y_{T\_mapping} - LSL_{\_mapping})\right)$;

wherein $\bar{y}_T$ represents a mean of the actual values of the characteristic in the fresh samples, and $\bar{y}_{T\_mapping}$ is a conversion value corresponding to $\bar{y}_T$;

Max $y_T$ represents the maximum value of the actual values of the characteristic in the fresh samples, and Max $y_{T\_mapping}$ is a conversion value corresponding to Max $y_T$;

Min $y_T$ represents the minimum value of the actual values of the characteristic in the fresh samples, and Min $y_{T\_mapping}$ is a conversion value corresponding to Min $y_T$;

LSL is a lower specification limit; LCL is a lower control limit; USL is an upper specification limit; UCL is an upper control limit; $LSL_{\_mapping}$ is a conversion value corresponding to the LSL; $LCL_{\_mapping}$ is a conversion value corresponding to the LCL; $USL_{\_mapping}$ is a conversion value corresponding to the USL; and $UCL_{\_mapping}$ is a conversion value corresponding to the UCL.

19. The computer program product as claimed in claim 18, wherein when $\bar{y}_{T\_mapping}$>DHI>$UCL_{\_mapping}$ (or $\bar{y}_{T\_mapping}$>DHI>$LCL_{\_mapping}$), the target device is healthy and normally operated;

when $UCL_{\_mapping}$>DHI>$USL_{\_mapping}$ (or $LCL_{\_mapping}$>DHI>$LSL_{\_mapping}$), the target device is sick and cannot work after remaining useful life (RUL) of the target device is worn out; and when $USL_{\_mapping}$>DHI>Max $y_{T\_mapping}$ (or $LSL_{\_mapping}$>DHI>Min $y_{T\_mapping}$), the target device is dead and needs maintenance immediately.

20. The computer program product as claimed in claim 18, the baseline predictive maintenance method further comprising:

converting the actual value ($y_T$) of the characteristic of the target device in the new workpiece sample and the healthy baseline value ($\hat{y}_B$) of the target device producing the new workpiece to a baseline error index (BEI) in accordance with a set of second conversion formulas as follows and performing the fault-detection-and-classification on the target device by using the BEI:

$y_E = |y_T - \hat{y}_B|$;

when $0 < y_E \le Spec$, $BEI = Zero_{\_mapping} - \left(\frac{y_E}{Spec} \times Spec_{\_mapping}\right)$;

when $Spec < y_E \le (HardSpec - \bar{y}_T)$, $BEI = Spec_{\_mapping} - \left(\frac{y_E - Spec}{(HardSpec - \bar{y}_T) - Spec} \times \left(Spec_{\_mapping} - (HardSpec - \bar{y}_T)_{\_mapping}\right)\right)$;

when $(HardSpec - \bar{y}_T) < y_E$,

-continued $$BEI = (HardSpec - \bar{y}_T)\_{mapping} - \left( \frac{y_E - (HardSpec - \bar{y}_T)}{Max\ y_E - (HardSpec - \bar{y}_T)} \times \left( (HardSpec - \bar{y}_T)\_{mapping} - Max\ y_{E\_mapping} \right) \right);$$

wherein Spec represents a specification of the target device; HardSpec represents a hard specification of the target device; Max $y_E$ represents the maximum $y_E$ of the fresh samples after conversion; Zero_*mapping* represents a conversion value corresponding to when $y_E=0$; Spec_*mapping* represents a conversion value corresponding to Spec; (HardSpec-$\bar{y}_T$)_*mapping* represents a conversion value corresponding to (HardSpec-$\bar{y}_T$); Max $y_{E\_mapping}$ represents a conversion value corresponding to Max $y_E$;

wherein when Zero_*mapping*>BEI>Spec_*mapping*, the target device is healthy and normally operated;

when Spec_*mapping*>BEI>(HardSpec-$\bar{y}_T$)_*mapping*, the target device is sick and cannot work after remaining useful life (RUL) of the target device is worn out; and when (HardSpec-$\bar{y}_T$)_*mapping*>BEI>Max $y_{E\_mapping}$, the target device is dead and needs maintenance immediately.

21. The computer program product as claimed in claim 20, the baseline predictive maintenance method further comprising:

computing the mean and standard deviation of the values of each of the processing parameters in the sets of TD-related process data (X) of the fresh samples and performing a standardization procedure therewith, thereby obtaining a baseline individual similarity index ($ISI_B$) of each of the processing parameters in the set of TD-related process data (X) of the new workpiece sample;

if DHI≥$DHI_T$ and the $ISI_B$ of each of the processing parameters in the set of TD-related process data (X) of the new workpiece sample is smaller than its $ISI_{B\_T}$, it represents that the target device is healthy and components corresponding to the processing parameters are normally operated;

if DHI≥$DHI_T$ and at least one of the baseline individual similarity indexes ($ISI_B$) of the processing parameters in the set of TD-related process data (X) of the new workpiece sample is greater than or equal to its $ISI_{B\_T}$, it represents that the target device is healthy but at least one of the components corresponding to the processing parameters is abnormal and should be checked;

if DHI<$DHI_T$ and BEI≥$BEI_T$; or DHI<$DHI_T$ and at least one of the baseline individual similarity indexes ($ISI_B$) of the processing parameters in the set of TD-related process data (X) of the new workpiece sample is greater than or equal to its $ISI_{B\_T}$, it represents that the target device is healthy but the target device is out-of-control (OOC) due to abnormality of at least one of the components corresponding to the processing parameters which should be checked; and if DHI<$DHI_T$ and BEI<$BEI_T$ and the $ISI_B$ of each of the processing parameters in the set of TD-related process data (X) of the new workpiece sample is smaller than its $ISI_{B\_T}$, it represents that the target device is abnormal and caused by itself and needs maintenance immediately; wherein $DHI_T$ is a threshold value of DHI, and $ISI_{B\_T}$ is a threshold value of $ISI_B$.

22. The computer program product as claimed in claim 16, the baseline predictive maintenance method further comprising:

obtaining a next new workpiece sample appearing when the target device is processing a next new workpiece, wherein the next new workpiece sample has the same elements as the new workpiece sample;

adding the next new workpiece sample to the modeling samples and then rebuilding the TD model by using the modeling samples in accordance with the conjecturing algorithm;

using the TD baseline model to compute another healthy baseline value ($\hat{y}_B$) of the target device when being processing the next new workpiece;

computing $y_E=|y_T-\hat{y}_B|$ of the new workpiece sample and the next new workpiece sample; and if the $y_E$ of the new workpiece sample and the $y_E$ of the next new workpiece sample both are greater than a threshold value, predicting remaining useful life (RUL) of the target device by using a predictive algorithm, wherein the predictive algorithm is a curve fitting method or a time-series forecasting method.

23. The computer program product as claimed in claim 22, wherein the curve fitting method is a linear curve fitting (LCF) method or an exponential curve fitting (ECF) method, and the time-series forecasting method is an auto-regressive integrated moving average (ARIMA) method.

* * * * *